(12) United States Patent
Nanci et al.

(10) Patent No.: US 7,527,237 B2
(45) Date of Patent: *May 5, 2009

(54) VALVE ACTUATION VELOCITY CONTROL DEVICE

(75) Inventors: James R. Nanci, Pittsburgh, PA (US); James E. Luzader, Pittsburgh, PA (US)

(73) Assignee: Ralph A. Hiller Company, Export, PA (US)

( * ) Notice: Subject to any disclaimer, the term of this patent is extended or adjusted under 35 U.S.C. 154(b) by 562 days.

This patent is subject to a terminal disclaimer.

(21) Appl. No.: 11/369,461

(22) Filed: Mar. 7, 2006

(65) Prior Publication Data

US 2006/0151730 A1    Jul. 13, 2006

Related U.S. Application Data

(63) Continuation-in-part of application No. 10/742,227, filed on Dec. 19, 2003, now Pat. No. 7,025,327.

(60) Provisional application No. 60/435,635, filed on Dec. 19, 2002.

(51) Int. Cl.
*F16K 47/00* (2006.01)

(52) U.S. Cl. .......................... 251/51; 251/54
(58) Field of Classification Search ............ 251/48, 251/50, 51, 54
See application file for complete search history.

(56) References Cited

U.S. PATENT DOCUMENTS

| 1,722,155 | A | 7/1929 | Myer |
| 2,207,921 | A | 7/1940 | Huxford |
| 2,439,523 | A | 4/1948 | Miller et al. |
| 3,064,675 | A | 11/1962 | Johnson et al. |
| 4,114,125 | A | 9/1978 | Komatsu |
| 4,527,502 | A | 7/1985 | Schmidt |
| 5,016,790 | A | 5/1991 | Thomas et al. |
| 5,832,883 | A | 11/1998 | Bae |
| 6,076,490 | A | 6/2000 | Esch et al. |
| 6,592,095 | B2 | 7/2003 | Kabasin et al. |

OTHER PUBLICATIONS

International Search Report dated May 7, 2004.

*Primary Examiner*—John Bastianelli
(74) *Attorney, Agent, or Firm*—Buchanan Ingersoll & Rooney PC

(57) ABSTRACT

The present invention is directed for use in a valve assembly including a housing having an axis and defining an interior, with fluid provided in the housing and substantially filling the housing interior, a valve stem disposed in the housing interior and a piston attached to the valve stem, wherein the piston and valve stem are moveable along the housing axis within the housing interior between first and second positions. The present invention includes a valve actuation control device disposed in the housing interior, the valve actuation control device allowing the fluid to freely flow from one side of the piston to the other side during at least a portion of the piston's movement between the first and second positions.

25 Claims, 16 Drawing Sheets

VALVE ACTUATION VELOCITY CONTROL DEVICE

CROSS-REFERENCE TO RELATED APPLICATIONS

This application is a continuation-in-part of co-pending patent application Ser. No. 10/742,227 entitled "Valve Actuation Velocity Control Device" filed on Dec. 19, 2003, which application claims the benefit of Provisional Patent Application Ser. No. 60/435,635 entitled "Valve Actuation Velocity Control Device", filed on Dec. 19, 2002, the entire disclosures of which are incorporated by reference herein.

FIELD OF THE INVENTION

The present invention is directed toward process valves and other valves used in applications that require characterized control and, more particularly, toward a process valve having an improved actuation velocity control device for characterizing the stem velocity of the valve, or item, during its movement between opening and closing, or between closing and opening, as desired for particular applications.

BACKGROUND OF THE INVENTION

Valves that are utilized in nuclear power plants for main steam or main feed water isolation, or other critical applications (e.g., gas turbines, dampers, etc.), are generally opened and closed utilizing valve actuators. Valves utilized in such critical applications are normally used for emergency shut-off purposes. Thus, these valve actuators must be operable to close the valve in a rapid period of time, typically within about three seconds or so. Opening the valve is typically less of a concern, since the primary purpose of the valve is for an emergency shut-off situation. However, if the valve is used for an emergency open purpose, the valve must be operable to open in a rapid period of time. Typical actuators utilized in such critical and non-critical applications include, but are not limited to, mechanical, electromechanical, hydraulic, pneumatic, and hydro-pneumatic powered actuators.

Various regulations govern the operational requirements for valves utilized in nuclear power plants. One such operational requirement is directed toward characterizing the flow of system media through the valve during the closing stroke of the valve in a predetermined manner. Typically, the system media flow through the valve has been characterized by an exponentially decreasing flow curve as the valve progresses through its closing stroke. However, recent requirements governing nuclear power plant use have called for a constant, or straight line, decreasing system media flow curve during the closing stroke of the valve. Thus, the valve actuators utilized in nuclear power plants will need to operate to close the valve in such a manner that the system media flow through the valve during its closing stroke is characterized by a constant, straight line decreasing curve.

Additionally, other applications may call for other desired system media flow curves during the valve closing stroke. Further yet, certain applications may call for desired system media flow characteristics during the valve opening stroke. While servo-electronics and fine electrical control have been utilized to characterize system media flow through valves in desired manners, when valves are used in applications such as for nuclear applications in containment or other harsh environments (e.g., excessive vibration, high temperatures, radiation, etc.), the use of servo-electronics and/or fine electrical systems presents a problem, in that the servo-electronics and/ or the fine electronics often cannot survive in the environment in which the valves are used. For critical applications where proper operation of the valve is essential (e.g., for safety concerns), the failure of servo-electronics and/or fine electrical systems to operate properly in opening and/or closing the valve can have catastrophic results.

The present invention is directed toward overcoming one or more of the above-mentioned problems.

SUMMARY OF THE INVENTION

The control flow through the actuator can be characterized as follows. The present invention is directed for use in a valve assembly including a housing having an axis and defining an interior, with fluid provided in the housing and substantially filling the housing interior. A valve stem is disposed in the housing interior and a piston is attached to the valve stem, wherein the piston and valve stem are moveable along the housing axis within the housing interior between first and second positions. Typically, movement of the piston from the first position to the second position defines either a closing stroke or an opening stroke of the valve assembly. The present invention includes a valve actuation control device disposed in the housing interior, the valve actuation control device allowing the fluid to freely flow from one side of the piston to the other side during at least a portion of the piston's movement between the first and second positions.

In one embodiment, the inventive valve actuation control device is configured to allow for the free flow of fluid from one side of the piston to the other during the first half of the valve closing stroke. Allowing the free flow of fluid during the first half of the valve closing stroke will provide for a high, initial stem velocity during the first half of the valve closing stroke. This, in turn, allows the system media flowing through the valve body to be characterized in a desired manner during the valve closing stroke, for example, as a constant, straight line decreasing curve. Providing for the free flow of fluid during the first half on the valve closing stroke, typically will, in turn, result in the free flow of fluid occurring during the second half of the valve opening stroke.

In another embodiment, the inventive valve actuation control device is configured to allow for the free flow of fluid from one side of the piston to the other during the first half of the valve opening stroke. Allowing the free flow of fluid during the first half of the valve opening stroke will provide for a high, initial stem velocity during the first half of the valve opening stroke. This, in turn, allows the system media flowing through the valve body to be characterized in a desired manner during the valve opening stroke as may be required for certain applications. Providing for the free flow of fluid during the first half on the valve opening stroke, typically will, in turn, result in the free flow of fluid occurring during the second half of the valve closing stroke.

In one form, the valve actuation control device includes at least one tube disposed in the housing interior generally parallel to the housing axis. The at least one tube includes at least one aperture formed therein for allowing the fluid to freely flow from one side of the piston to the other side during at least a portion of the piston's movement between the first and second positions.

In a further form, the at least one tube extends between first and second cylinder heads which seal the valve housing at its axial ends. One end of the at least one tube is sealed against one of the cylinder heads, and the other end of the at least one tube opens into the housing interior via a port formed in the other cylinder head. Fluid flow through the cylinder head port will be controlled via an adjustable radial screw received in the cylinder head port. The at least one tube is received through a cooperating aperture(s) formed in the piston, allowing the piston to move without damaging the at least one tube.

In one form, the least one aperture is formed in a portion of the at least one tube which is along the first half of the valve closing stroke (and, in turn, along the second half of the valve opening stroke). In another form, the least one aperture is formed in a portion of the at least one tube which is along the first half of the valve opening stroke (and, in turn, along the second half of the valve closing stroke). In a preferred form, the at least one tube includes three tubes, and the at least one aperture includes three apertures.

In another form of the present invention, the valve actuation control device includes inner and outer coaxial housings, with the piston and valve stem moveable along the housing axis within the inner housing interior between the first and second positions. The inner housing includes at least one slot formed therein for allowing the fluid to freely flow from one side of the piston to the other side during at least a portion of the piston's movement between the first and second positions. The outer housing may include at least one channel formed therein alignable with the at least one slot in the inner housing for further allowing the free flow of fluid from one side of the piston to the other side during at least a portion of the piston's movement between the first and second positions.

In one form, the at least one slot and the at least channel are formed in the inner and outer housings, respectively, in a portion of the housings which is along the first half of the valve closing stroke (and, in turn, along the second half of the valve opening stroke). In another form, the at least one slot and the at least channel are formed in the inner and outer housings, respectively, in a portion of the housings which is along the first half of the valve opening stroke (and, in turn, along the second half of the valve closing stroke). In a preferred form, the at least one channel includes four channels equiangularly spaced about the housing axis, and the at least one slot includes four slots also equiangularly spaced about the housing axis. One, or both, of the inner and outer housings may be rotatable in order to selectively align the at least one slot with the at least one channel.

The valve actuation velocity control device of the present inventive assembly includes various objectives, including, but in no way limited to, the following:

It is an object of the present invention to close a valve in a manner such that the system media flow through the valve is characterized as a constant, straight line decreasing curve during the valve closing stroke.

It is an object of the present invention to close a valve with a high initial stem velocity.

It is an object of the present invention to close a valve with a high initial stem velocity, and then a constant, slower stem velocity through the balance of the valve closing stroke.

It is an object of the present invention to operate parallel gate, wedge gate and globe valves, and other valves as applicable, using an actuation device that characterizes the stem velocity of the valve during its opening and/or closing stroke.

It is an object of the present invention to provide a valve with an actuation velocity control device which is adjustable to allow adjustment of the high initial stem velocity, and hence the system media flow characteristics, during the valve closing stroke.

It is an object of the present invention to open and/or close a valve in a manner such that the system media flow through the valve is characterized in a desired manner and, further, is characterized in a desired manner without the use of servo-electronics and/or fine electrical control.

It is an object of the present invention to open a valve with a high initial stem velocity.

It is an object of the present invention to open a valve with a high initial stem velocity, and then a constant, slower stem velocity through the balance of the valve opening stroke.

It is an object of the present invention to provide a valve with an actuation velocity control device which is adjustable to allow adjustment of the high initial stem velocity, and hence the system media flow characteristics, during the valve opening stroke.

It is an object of the present invention to open and close a valve with a high initial stem velocity, and then a constant, slower stem velocity through the balance of the valve opening and closing stroke It is an object of the present invention to apply the inventive valve assembly to nuclear critical and non-critical applications.

It is an object of the present invention to characterize the system media flow through a valve in a desired manner during opening and/or closing of the valve using mechanical control.

It is an object of the present invention to provide for specialized control of a valve during opening and/or closing where there is a restriction on electronics during to the environmental conditions in which the valve operates.

It is an object of the present invention to mechanically control the opening and/or closing of a valve in a manner such that the system media flow through the valve is characterized in a desired manner, which has been previously achievable using servo-electronics and/or fine electrical control.

Other object, aspects and advantages of the present invention can be obtained from a study of the specification, the drawings, and the appended claims.

BRIEF DESCRIPTION OF THE DRAWINGS

FIG. 5 is an enlarged partial view of the valve assembly shown in FIG. 4a;

DETAILED DESCRIPTION OF THE INVENTION

The present invention consists of a valve assembly which achieves at least the above-identified objectives. The inventive valve assembly includes a valve, a valve actuator and an actuation velocity control device which is designed to control the valve stem velocity to characterize the system media flow through the valve in a desired manner.

Figure 1:
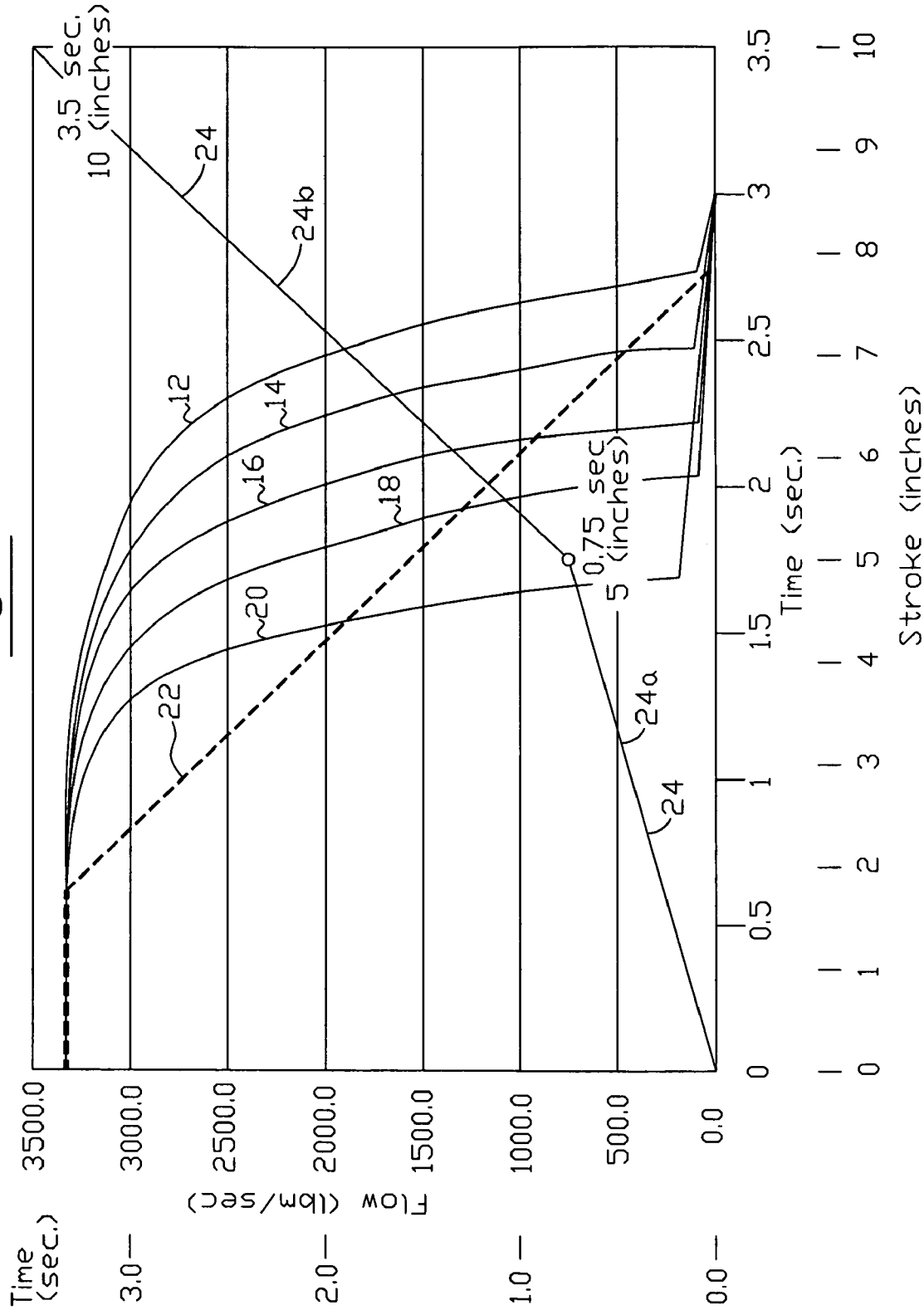
FIG. 1 is a graph illustrating the media flow characteristics for conventional valves, as well as the desired media flow characteristic using one embodiment of the inventive valve assembly (media flow vs. time—inner legend), and the relationship of the desired media flow characteristic with the stem velocity of the inventive valve assembly during the valve closing stroke (time vs. valve stroke—outer legend)

FIG. 1 is a graph of system media flow vs. time (inner legend) for various valve closing speeds for typical process valves utilized in nuclear power plant applications. Curve 12 illustrates the media flow characteristics for a valve having a 2.75 second closing time; curve 14 illustrates the media flow characteristics for a valve having a 2.50 second closing time; curve 16 illustrates the media flow characteristics for a valve having a 2.25 second closing time; curve 18 illustrates the media flow characteristics for a valve having a 2.0 second closing time; and curve 20 illustrates the base media flow characteristics during the closing stroke of a typical process valve having approximately a 1.75 second closing time.

As shown in FIG. 1, the media flow characteristics through the valves utilized to generate the curves 12, 14, 16, 18 and 20 are generally represented by an exponentially decreasing curve as the valve proceeds through its closing stroke. However, recent regulations pertaining particularly to nuclear power plants and other critical applications have required that the media flow characteristics through the valve during its closing stroke be represented by a constant, straight line decreasing media flow curve. The desired linear characteristic (media flow vs. time) of a constant, decreasing media flow during the valve closing stroke is illustrated by the dotted line 22 in FIG. 1. Thus, the inventive valve assembly needs to be able to close the valve in such a manner to achieve the desired media flow characteristic curve 22 during the valve closing stroke. The characteristic curve 22 represents a constant, decreasing media flow velocity through a valve having approximately a 2.75 second closing time. However, it should be understood that the inventive valve assembly may incorporate other closing times (shorter or longer) without departing from the spirit and scope of the present invention. It should be further understood that the inventive valve assembly may incorporate various desired opening and/or closing times to achieve various desired media flow characteristic curves during opening and/or closing without departing from the spirit and scope of the present invention.

The valve actuation velocity control device of the present invention has been found, in one embodiment, to achieve the desired media flow characteristic curve 22 by providing for a high, initial valve stem velocity during an initial portion of the closing stroke, and then providing for a constant, slower valve stem velocity through the balance of the closing stroke. The valve stem velocity representation is shown at 24 in FIG. 1, which is graphed utilizing the outer legend of time vs. valve stroke.

Typically, valves have opening and closing strokes which encompass movement of approximately 10 inches during opening and closing. As shown in FIG. 1, during the first half of the closing stroke (line 24a), the valve stem has an initially high velocity, moving approximately 5 inches in approximately 0.75 seconds (≈6.67 in/sec). During the second half of the closing stroke (line 24b), the valve stem has a slower velocity, moving the remaining approximately 5 inches in approximately 2.75 seconds (≈1.82 in/sec). By controlling the stem velocity in a manner shown by line 24, the desired media flow characteristic illustrated by line 22 can be achieved during the valve closing stroke.

Figure 2A:
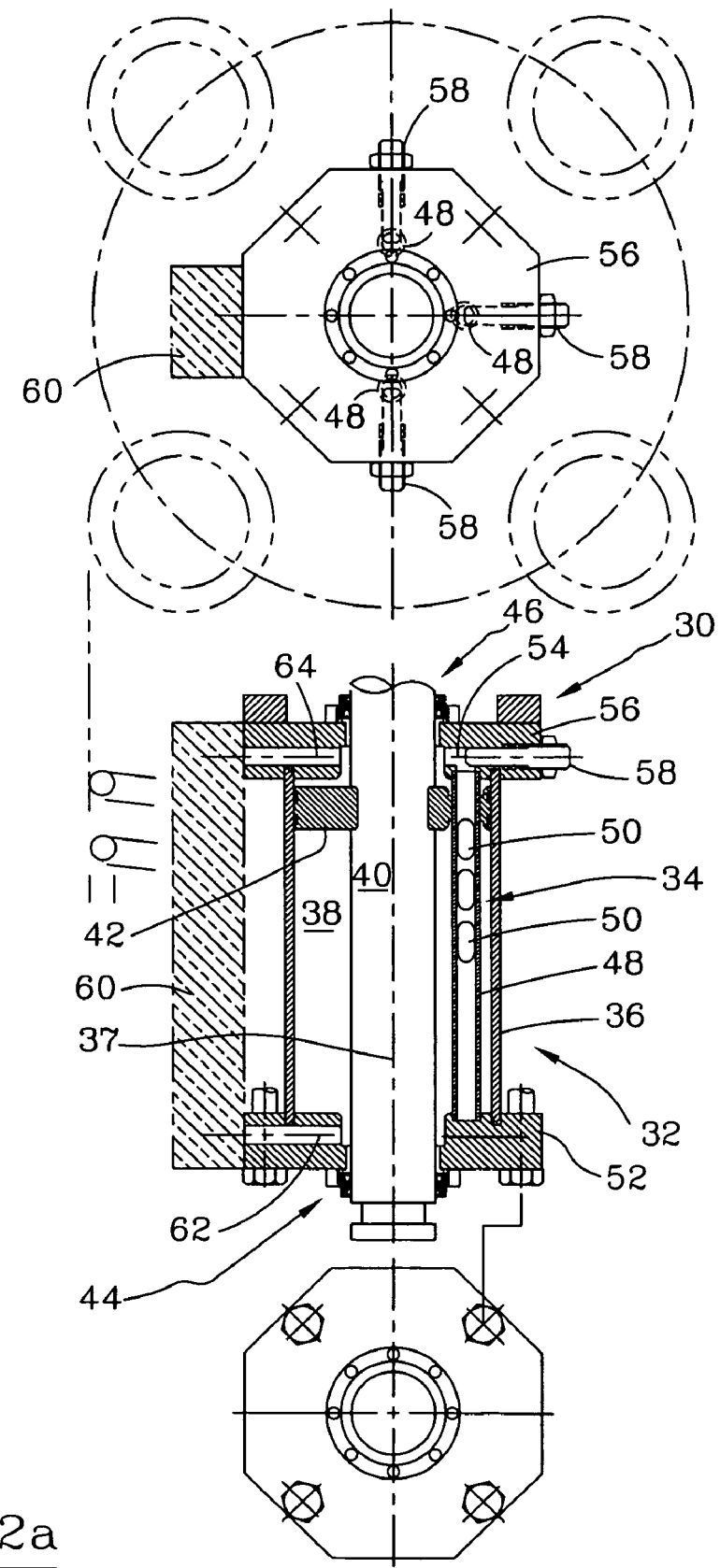
FIGS. 2a-c are partial cross-sectional views of a valve assembly according to a first embodiment of the present invention, with the valve in open (FIG. 2a), half closed (half stroke) (FIG. 2b) and fully closed (full stroke) (FIG. 2c) positions.
Figure 2B:
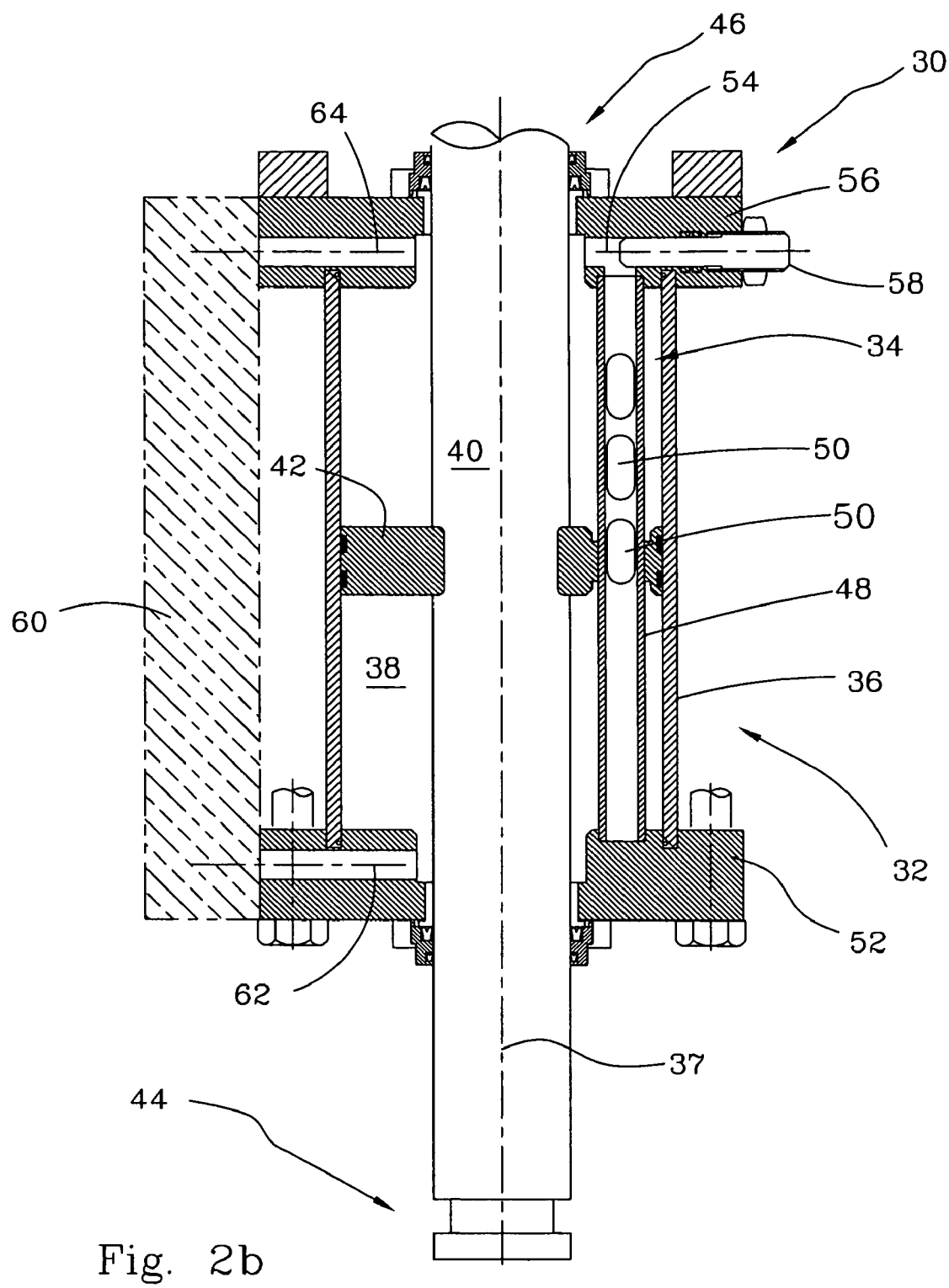
Figure 2C:
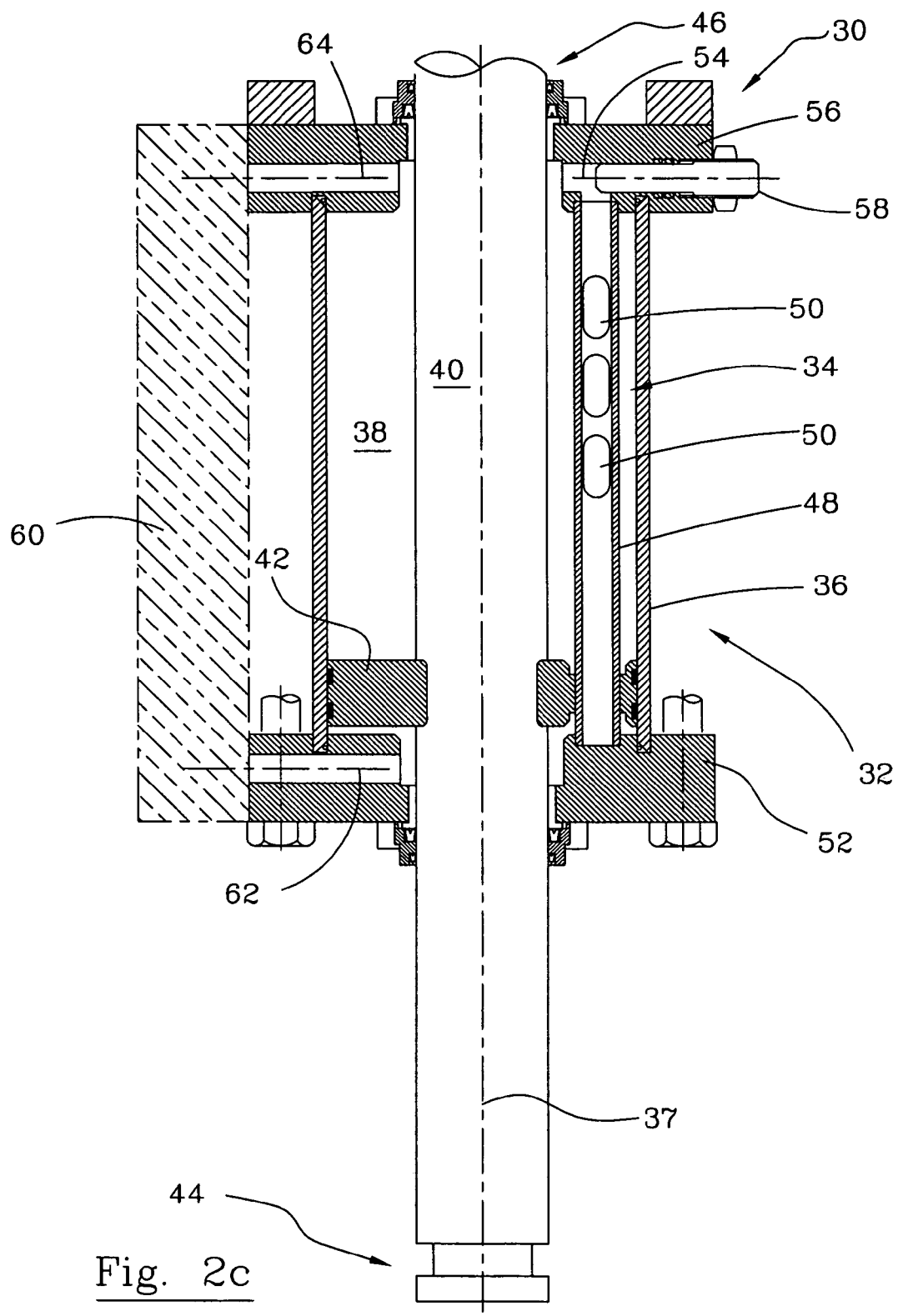
Figure 3:
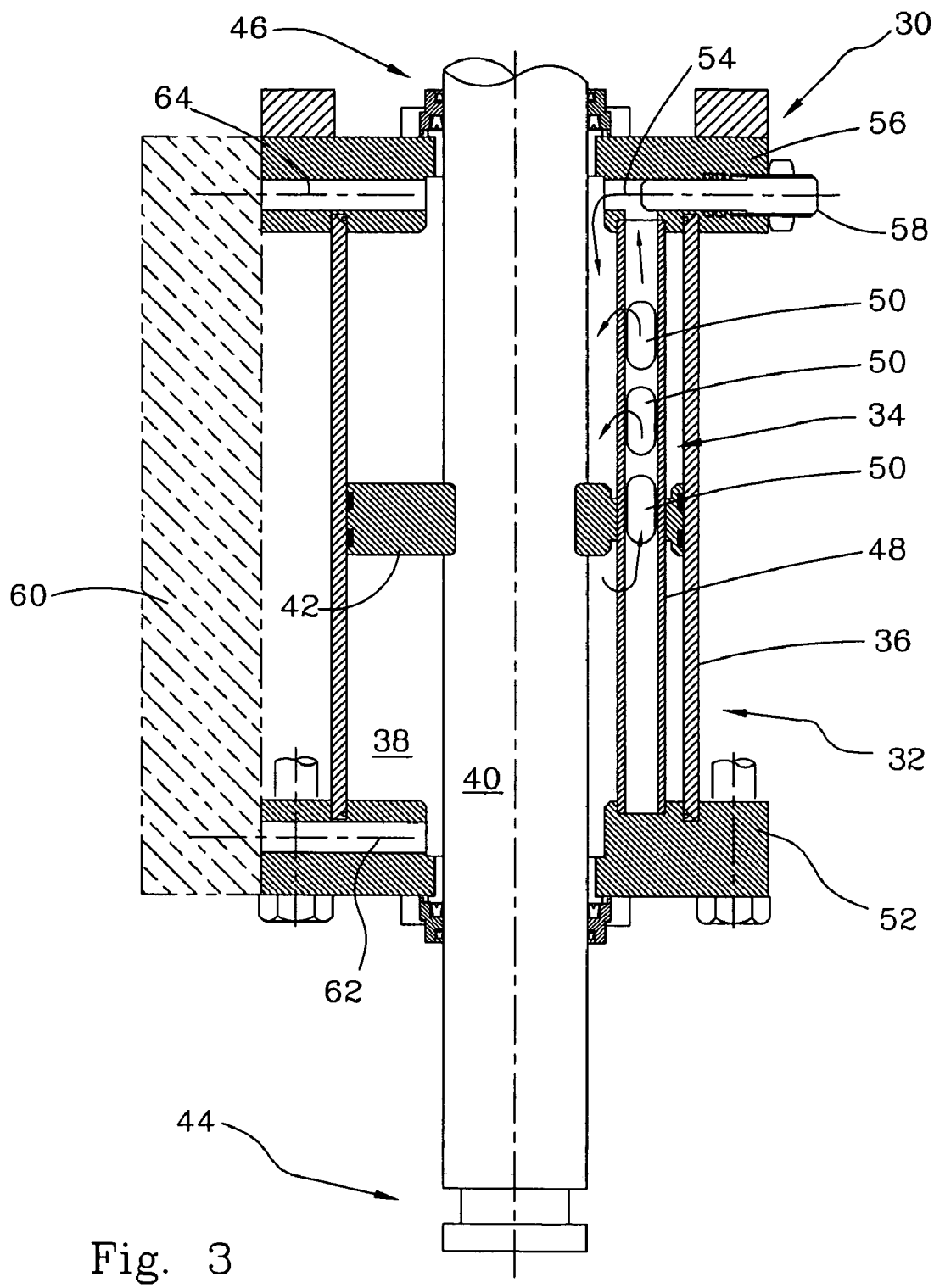
FIG. 3 is an enlarged view of the valve assembly shown in FIG. 2b.

FIGS. 2-3 show graphic illustrations of a first embodiment of the inventive valve assembly, shown generally at 30, which includes a valve 32 having the inventive valve actuation velocity control device 34. FIG. 2a illustrates the valve assembly 30 in a fully open position; FIGS. 2b and 3 illustrate the valve assembly 30 in a half closed (half stroke) position; and FIG. 2c illustrates the valve assembly 30 in a fully closed (full stroke) position. For clarity purposes, the valve actuator, valve body and valve gate have been omitted from FIGS. 2-3.

As shown in FIGS. 2-3, the valve 32 includes a generally cylindrical housing 36 having an axis 37 and defining an interior 38. The valve 32 further includes a valve stem 40 to which a piston 42 is attached, with the valve stem 40 and piston 42 disposed within the housing interior 38. A lower portion 44 of the stem 40 is attached to a valve gate (not shown) which is received within a valve body (also not shown) in a well-known manner. Movement of the stem 40 effectuates movement of the gate to open and close the port formed through the valve body as is known in the relevant art. The upper portion 46 of the stem 40 is connected to a conventional valve actuator (not shown) which effectuates movement of the stem 40 to move the valve 32 between its open and closed positions.

The interior 38 of the cylindrical housing 36 is typically filled with hydraulic, or other, fluid which surrounds the stem 40 and piston 42. The valve actuation velocity control device 34 is disposed within the housing interior 38. The valve actuation velocity control device 34 includes tubes 48 positioned within the housing interior 38. Hydraulic fluid provided in the housing interior 38 surrounds the tubes 48 and fills the interiors thereof. The tubes 48 each include openings 50 formed in an upper portion of the tubes 48, with the lower ends of the tubes 48 being sealed against the cylinder head 52. The upper ends of the tubes 48 open into ports 54 formed in the cylinder head 56. The ports 54 open into the housing interior 38, and fluid flow through the ports 54 may be controlled with adjustable radial screws 58 received in the cylinder head 56.

The valve assembly 30 further includes a conventional force compensating assembly 60 attached to the cylinder heads 52 and 56 and in fluid communication with the housing interior 38 via ports 62 and 64 formed in the cylinder heads 52 and 56, respectively. Typically, during opening and closing of the valve 32, the force compensating assembly 60 receives hydraulic fluid from within the housing interior 38 and will conventionally control the speed of the valve stem 40. The inventive valve actuation velocity control device 34 provides for an initial high stem 40 velocity during the first half of the closing stroke, while the force compensating assembly 60 will be used to control the stem 40 velocity during the second half of the closing stroke.

Prior to initiating a closing stroke, the valve 32 will typically be in the fully open position shown in FIG. 2a, with the piston 42 positioned at the top of the housing interior 38. As shown in FIGS. 2-3, the piston 42 includes apertures formed therethrough to accommodate the tubes 48. The tubes 48 should fit snugly within the apertures, while allowing the piston 42 to move without damaging the tubes 48. As the closing stroke is initiated by the actuator (not shown), the piston 42 and stem 40 are moved downward to the position shown in FIGS. 2b and 3, which illustrate the valve 32 in a half closed, or half stroke, position. As the piston 42 moves from the position shown in FIG. 2a to the position shown in FIGS. 2b and 3, very little hydraulic fluid will be forced through the lower port 62 and into the force compensating assembly 60. Most of the hydraulic fluid will be forced and flow from the bottom side of the piston 42, through the openings 50 in the tubes 48, and up through tubes 48 and back into the housing interior 38 on the top side of the piston 42. The hydraulic fluid may either flow back to the housing interior 38 through an adjacent opening 50 to the top side of the piston 42, or may flow up the tubes 48 into the cylinder head ports 54 and subsequently to the top side of the piston 42, as shown by the flow arrows in FIG. 3. The fluid flow is regulated by both the adjustable radial screws 58 received in the cylinder head 56, and by the geometric aspects of the tubes 48 and the openings 50. In this manner, during the first half of the valve closing stroke, the valve stem 40, and hence the valve gate (not shown), will have a high velocity (line 24*a* in FIG. 1) as the hydraulic fluid will flow freely into and out of the tubes 48. Preferably, the initial high velocity of the stem 40 is a constant velocity, as shown by line 24*a* in FIG. 1.

While adjustable radial screws 58 are shown for controlling hydraulic fluid flow through the cylinder head ports 54, it should be understood that the screws 58 may be replaced with a mechanically or electrically controlled orificing system, possibly similar to system 60, for more intricate control of the hydraulic fluid flow through the cylinder head ports 54.

During the second half of the valve closing stroke, as the stem 40 and piston 42 move from the position shown in FIGS. 2*b* and 3 to the position shown in FIG. 2*c*, the openings 50 in the tubes 48 do not effect the velocity of the stem 40, as no fluid is flowing through the tubes 48 to the top side of the piston 42. The openings 50 in the tubes 48 will be located on the top side of the piston 42 during the second half of the valve closing stroke. The hydraulic fluid will be forced and flow into the cylindrical head port 62, through the force compensating assembly 60, and back to the housing interior 38 at the top side of the piston 42 through cylinder head port 64. The force compensating assembly 60 will conventionally control the closing speed of the stem 40 during the second half of the valve closing stroke. Preferably, the force compensating assembly 60 will provide for a constant velocity of the stem 40 through the second half of the valve closing stroke (see line 24*b* in FIG. 1).

Conversely, during the first half of the valve opening stroke, the openings 50 in the tubes 48 will have no effect on the velocity of the stem 40, and the force compensating assembly 60 will conventionally control the stem velocity during the first half of the valve opening stroke as the hydraulic fluid will be forced through the force compensating assembly 60 via ports 64 and 62. The openings 50 in the tubes 48 are disposed on the top side of the piston 42 during the first half of the valve opening stroke. During the second half of the valve opening stroke, the hydraulic fluid will flow in a manner reverse to that of the first half of the valve closing stroke, flowing through the tube openings 50 and port 54 down through the tubes 48, and back out of the openings 50 on the bottom side of the piston 42. The valve actuation velocity control device 34 may thus be utilized in controlling the speed of the valve stem 40 during the second half of the valve opening stroke.

The main aspect of the invention shown in FIGS. 2-3 is to control the operating velocity of the valve stem 40 during the valve closing stroke. By adjustment of the radial screws 58 and the geometry of the tubes 48 and openings 50, the closing stroke of the valve 32 can be characterized in a desired manner, for example, in a manner as illustrated by line 24 in FIG. 1. In turn, the system media flowing through the valve body (not shown) will be characterized in a desired manner during the valve closing stroke, for example, as indicated by the line 22 in FIG. 1. Controlling the operating velocity of the valve stem 40 during the valve opening stroke is typically less of a concern, since valves used in critical and nuclear applications are typically used for emergency shut-off purposes. However, one skilled in the art will readily appreciate that the valve actuation control device of the present invention can be implemented to control the valve stem 40 to achieve, for example, a desired media flow characteristic, during the valve opening stroke without departing from the spirit and scope of the present invention.

It should be understood that while three tubes 48, each having three openings 50, are shown in the assembly 30 of FIGS. 2-3, the valve actuation velocity control device 34 may include any number of tubes 48 and/or openings 50 without departing from the spirit and scope of the present invention. In accordance with the present invention, the number, sizes and geometries of the tubes 48 and openings 50, as well as the location of the openings 50 along the lengths of the tubes 48, may be varied in order to achieve a desired media flow characteristic during opening and/or closing of the valve 32.

Figure 4A:
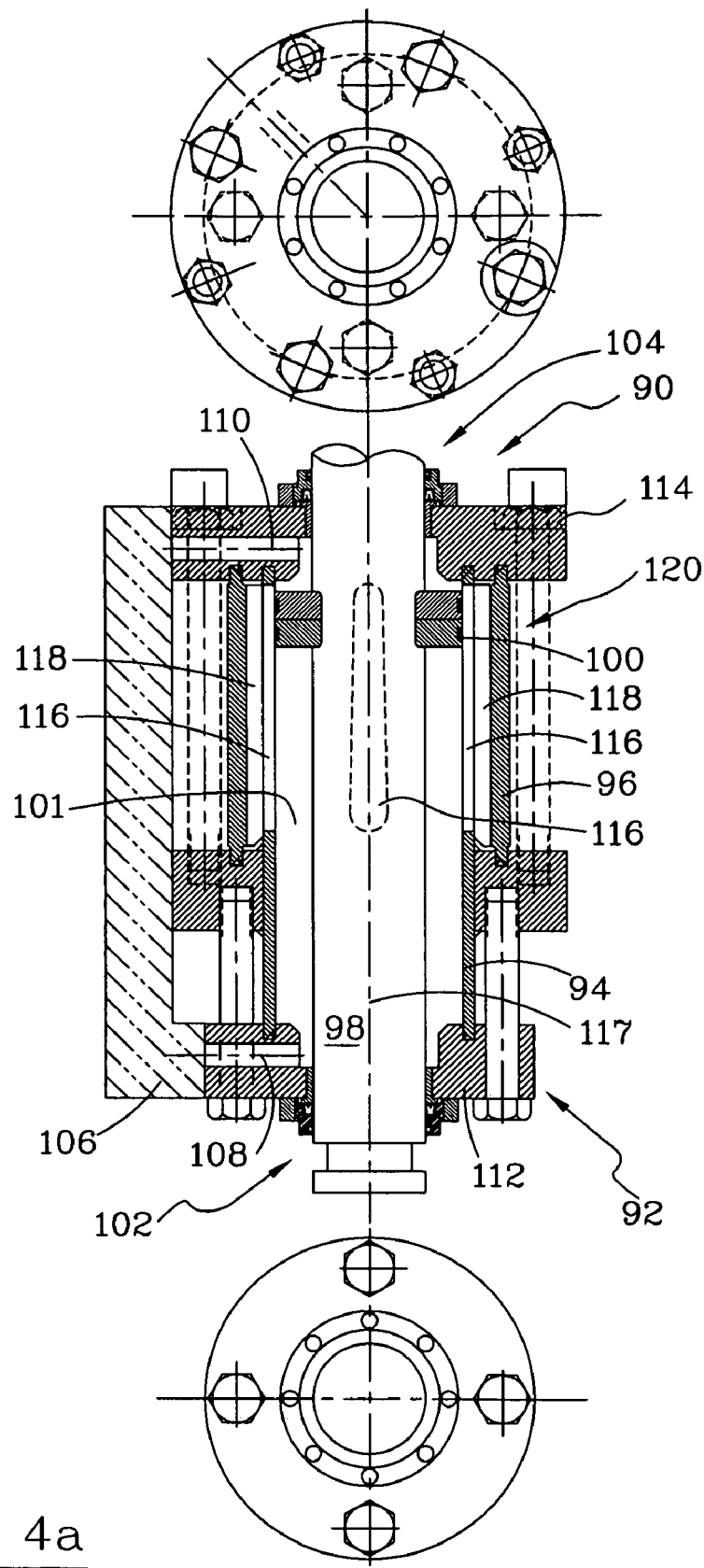
FIGS. 4a-c are partial cross-sectional views of a valve assembly according to a second embodiment of the present invention, with the valve in open (FIG. 4a), half closed (half stroke) (FIG. 4b) and fully closed (full stroke) (FIG. 4c) positions.
Figure 4B:
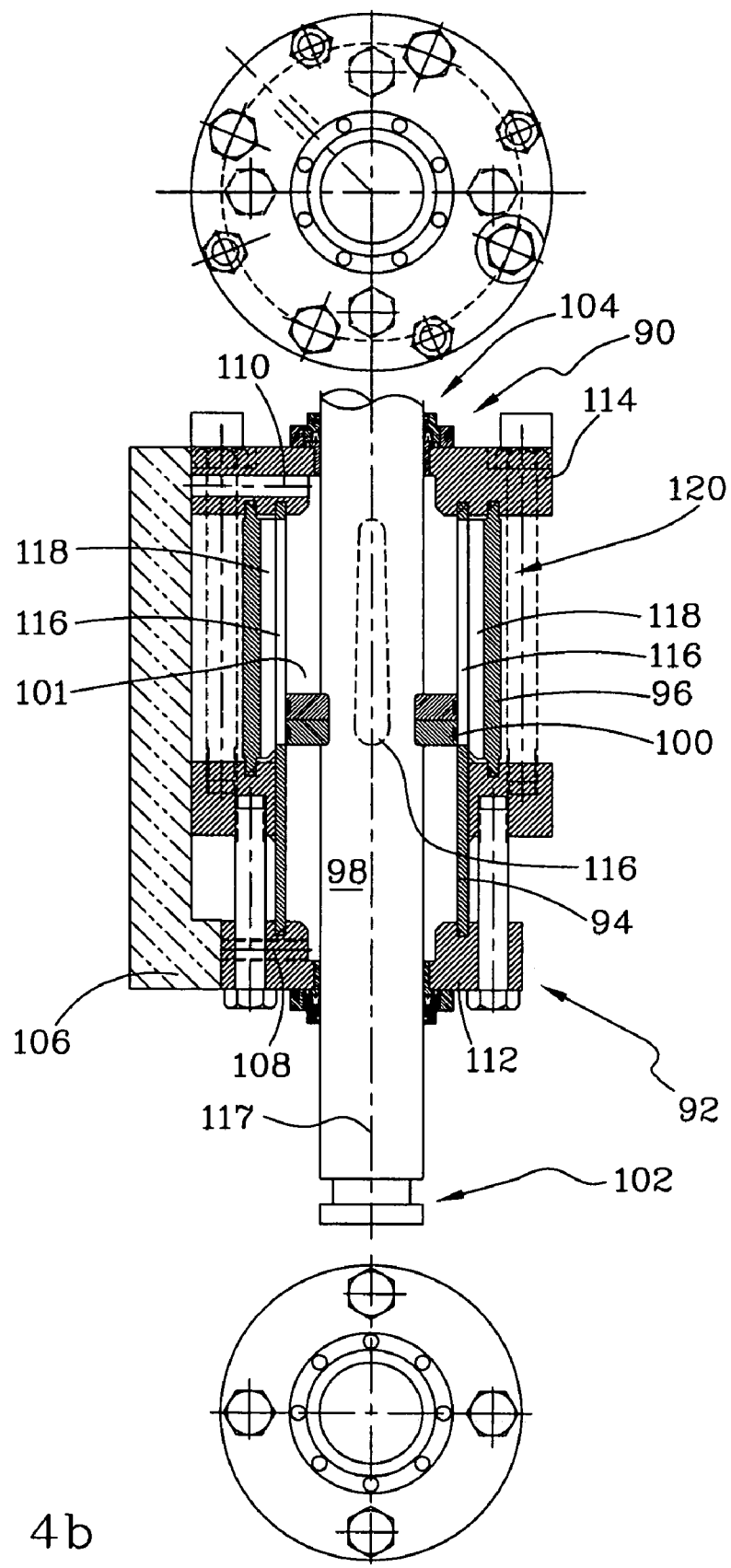
Figure 4C:
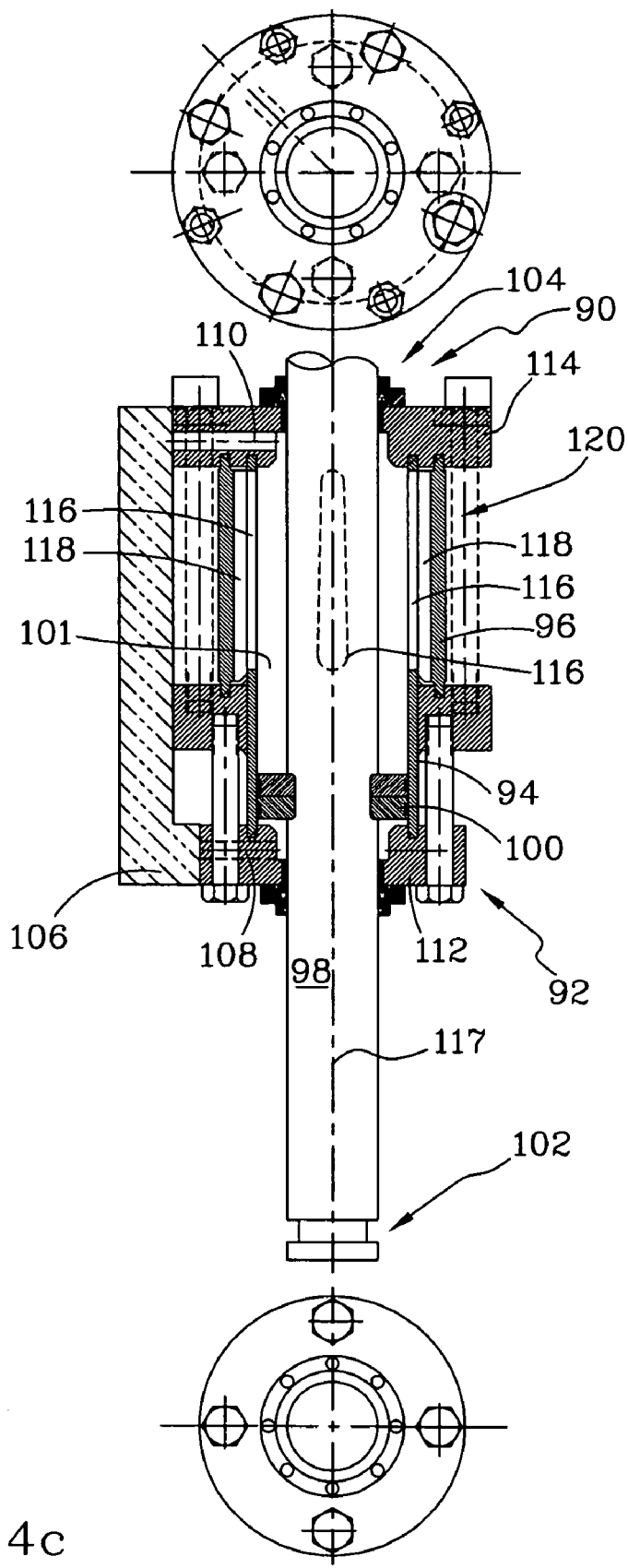
Figure 6:
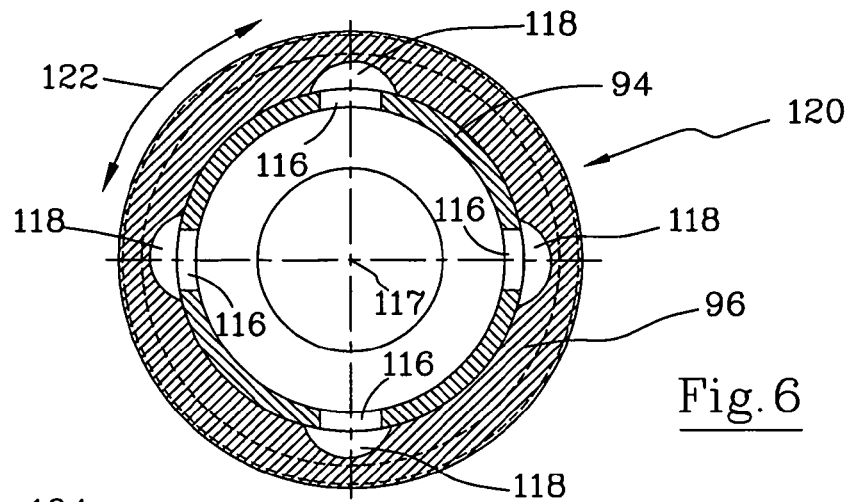
FIG. 6 is a cross-sectional view taken along line A-A in FIG. 5.
Figure 5:
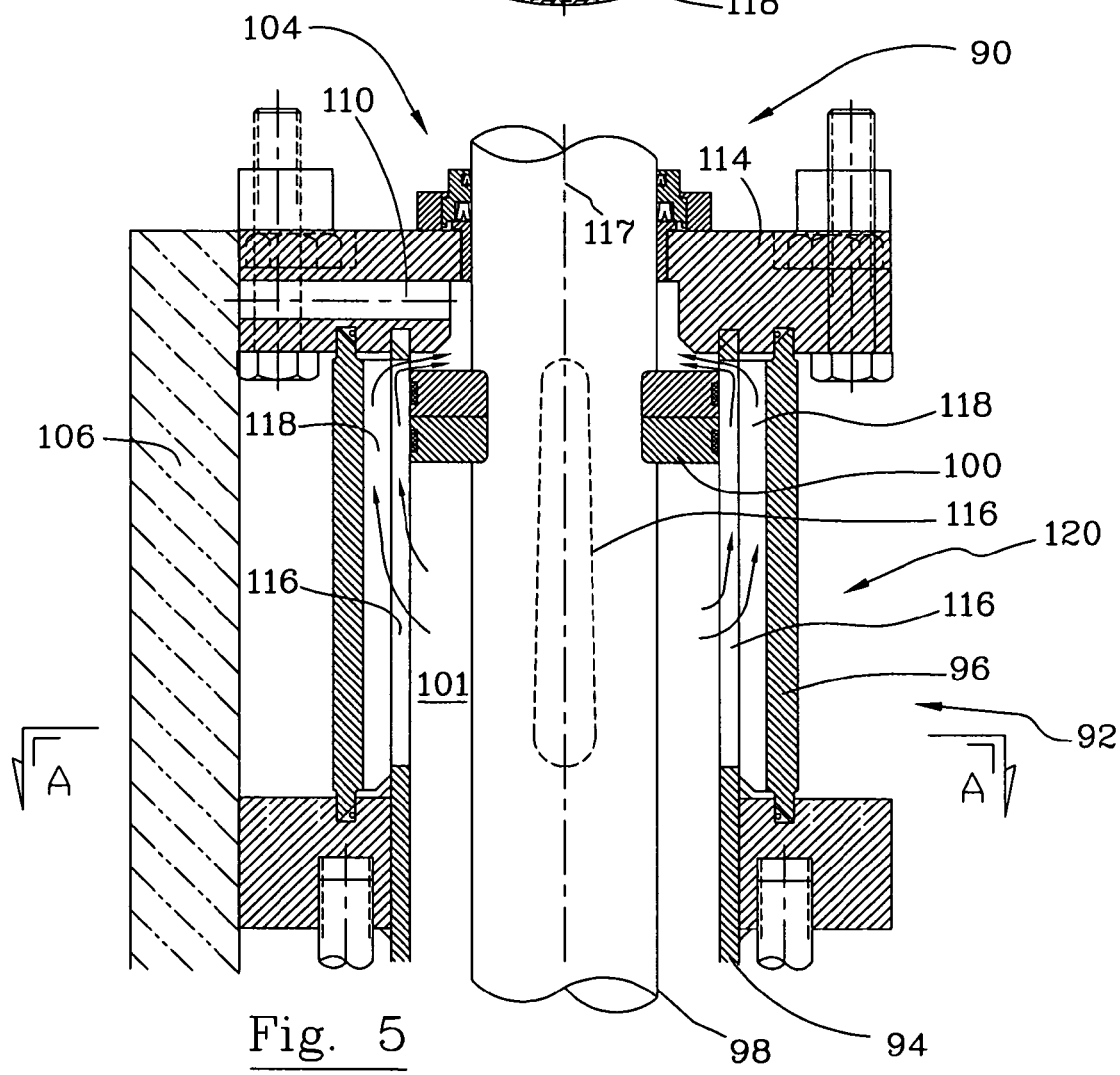

FIGS. 4-6 show graphic illustrations of a second embodiment of the inventive valve assembly, shown generally at 90. FIGS. 4*a* and 5 illustrate the valve assembly 90 in a fully open position; FIG. 4*b* illustrates the valve assembly 90 in a half closed (half stroke) position; and FIG. 4*c* illustrates the valve assembly 90 in a fully closed (full stroke) position. For clarity purposes, the valve actuator, valve body and valve gate have been omitted from FIGS. 4-6.

The assembly 90 includes a valve 92 having inner 94 and outer 96 cylindrical housings. The inner cylindrical housing 94 extends along the entire length of the valve 92, while the outer cylindrical housing 96 extends along only an upper half of the valve 92. The valve 92 further includes a valve stem 98 and a piston 100 attached to the valve stem 98 for movement therewith. Both the stem 98 and piston 100 are disposed within the housing interior 101 defined by the inner cylindrical housing 94. The lower portion 102 of the valve stem 98 is connected to a valve gate (not shown) which is received in a valve body (also not shown) in a well-known manner. The upper portion 104 of the valve stem 98 is connected to a conventional valve actuator (not shown) which effectuates opening and closing of the valve 92 as is known in the relevant art. The assembly 90 further includes a force compensating assembly 106, similar in construction to the force compensating assembly 60 shown in FIGS. 2-3. The force compensating assembly 106 is fluidly connected to the housing interior 101 via ports 108 and 110 formed in cylinder heads 112 and 114, respectively, in a conventional manner. The force compensating assembly 106 will control the valve stem 98 velocity during the second half of the valve closing stroke and the first half of the valve opening stroke in a conventional manner as previously described.

The inner cylindrical housing 94 includes a plurality of slots 116 formed therein. As shown more clearly in FIG. 6, in one form, the inner cylindrical housing 94 includes four slots 116 spaced equiangularly about the housing axis 117. The outer cylindrical housing 96 includes four axial channels 118 formed therein, also equiangularly spaced about the housing axis 117. The axial channels 118 are alignable with the slots 116, one each, to provide paths for the hydraulic fluid as the piston 100 is moved along the housing interior 101 to open and close the valve 92. Since the channels 118 are alignable with the slots 116, the outer cylindrical housing 96 may only be provided about the inner cylindrical housing 94 in that portion of the inner cylindrical housing 94 having the slots 116. The housing interior 101 is filled with hydraulic, or other, fluid. The hydraulic fluid surrounds the stem 98 and piston 100, and fills the slots 116 and channels 118. The inner 94 and outer 96 housings, and the slots 116 and channels 118 formed therein, together make up the valve actuation velocity control device 120.

Prior to initiating a closing stroke, the valve 92 will be in the fully open position shown in FIGS. 4a and 5, with the piston 100 positioned at the top of the housing interior 101. Upon initiation of the closing stroke, the actuator (not shown) moves the stem 98 and piston 100 downward from the position shown in FIGS. 4a and 5 to the position shown in FIG. 4b, which illustrates the valve 92 in a half closed (half stroke) position. As the piston 100 is moved downward during the first half of the closing stroke, very little hydraulic fluid will enter the force compensating assembly 106 via port 108. Most of the hydraulic fluid will flow from the bottom side of the piston 100 through the slots 116 and into the channels 118, around the piston 100, and back into the housing interior 101 at the top side of the piston 100, as shown by the flow arrows in FIG. 5. Flow of fluid in this manner will continue until the piston 100 reaches the half stroke position shown in FIG. 4b. The fluid flow is regulated by the sizes and geometric aspects of the slots 116 ad channels 118, as well as the alignment of the slots 116 and channels 118 as will be described infra. In this manner, during the first half of the valve closing stroke, the valve stem 98, and hence the valve gate (not shown), will have a high velocity (line 24a in FIG. 1) as the hydraulic fluid will flow freely through the slots 116 and channels 118. Preferably, the initial high velocity of the stem 98 is a constant velocity, as shown by line 24a in FIG. 1.

During the second half of the valve closing stroke, as the stem 98 and piston 100 move from the position shown in FIG. 4b to the position shown in FIG. 4c, the slots 116 and channels 118 do not effect the velocity of the stem 98, as no fluid is flowing through the slots 116 and channels 118 to the top side of the piston 100. The slots 116 and channels 118 will be located on the top side of the piston 100 during the second half of the valve closing stroke. Rather, the hydraulic fluid is forced into the force compensating assembly 106 via port 108, flows through the force compensating assembly 106 and back to the housing interior 101 at the top side of the piston 100 via port 110. The force compensating assembly 106 conventionally controls the velocity of the stem 98 to have a constant velocity (see line 24b in FIG. 1) during the second or last half of the valve closing stroke.

Conversely, during the first half of the valve opening stroke, as the piston 100 moves from the position shown in FIG. 4c to the position shown in FIG. 4b, the speed of the stem 98 will be conventionally controlled by the force compensating assembly 106, and the slots 116 and channels 118 will have no effect on the stem 98 velocity. The slots 116 and channels 118 are disposed on the top side of the piston 100 during the first half of the valve opening stroke. During the last half of the valve opening stroke, the hydraulic fluid will flow in a manner reverse to that of the first half of the valve closing stroke, as the slots 116 and channels 118 will allow fluid to flow from the top side of the piston 100 to the bottom side of the piston 100. The valve actuation velocity control device 120 may thus be utilized in controlling the speed of the stem 98 during the second half of the valve opening stroke.

The assembly 90 shown in FIGS. 4-6 will allow the valve stem 98 to have a high initial velocity during the first half of the valve closing stroke, since fluid will flow freely through the slots 116 and channels 118 from the bottom side to the top side of the piston 100. During the last half of the valve closing stroke, the force compensating assembly 106 will conventionally control the stem velocity. Configuration of the assembly 90 in this manner allows the closing stroke of the valve 92 to be characterized in a desired manner, for example, in a manner as illustrated by line 24 in FIG. 1. In turn, the system media flowing through the valve body (not shown) will be characterized in a desired manner during the valve closing stroke, for example, as represented by the dotted line 22 in FIG. 1. Controlling the operating velocity of the valve stem 98 during the valve opening stroke is typically less of a concern, since valves used in critical and nuclear applications are typically used for emergency shut-off purposes. However, one skilled in the art will readily appreciate that the valve actuation control device of the present invention can be implemented to control the valve stem 98 to achieve, for example, a desired media flow characteristic, during the valve opening stroke without departing from the spirit and scope of the present invention.

While FIGS. 4-6 illustrate four slots 116 and four channels 118 utilized in the valve actuation velocity control device 120, one skilled in the art will appreciate that any number of slots 116 and channels 118 may be formed in the housings 94 and 96, respectively, without departing from the spirit and scope of the present invention. In accordance with the present invention, the number, sizes and geometries of the slots 116 and channels 118, as well as the location of the slots 116 and channels 118 along the length of the valve 92 may be varied to regulate the fluid flow, and thus the stem 98 closing speed, in order to achieve a desired media flow characteristic during opening and/or closing of the valve 92.

Additionally, the outer housing 96 may be rotatable, as indicated by arrow 122, to align either all of the channels 118 with the slots 116, as shown in FIG. 6, or to align only a portion of the channels 118 with the slots 116 to achieve the desired media flow characteristic. Typically, the inner housing 94 will be non-rotatable so that a sufficient bottom seal may be formed between the inner housing 94 and the cylinder head 112. However, if desired for a particular application, the inner housing 94 may also be rotatable to align the slots 116 and channels 118. Further, it will be appreciated that for particular applications the channels 118 may be omitted as the hydraulic fluid will readily flow to the opposite side of the piston 100 via the slots 116.

Figure 7A:
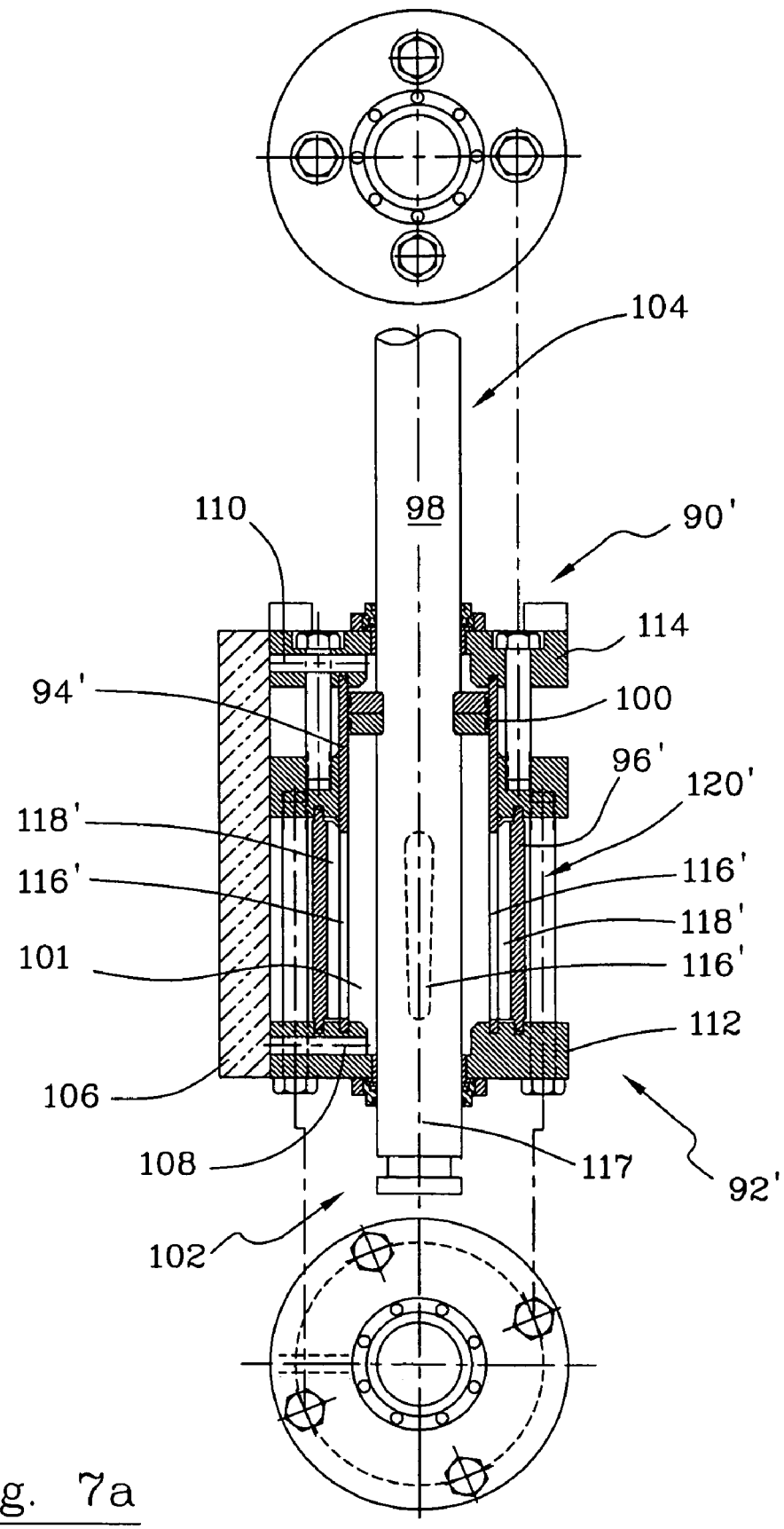
FIGS. 7a-c are partial cross-sectional views of a valve assembly according to a third embodiment of the present invention, with the valve in open (FIG. 7a), half closed (half stroke) (FIG. 7b) and fully closed (full stroke) (FIG. 7c) positions.
Figure 7B:
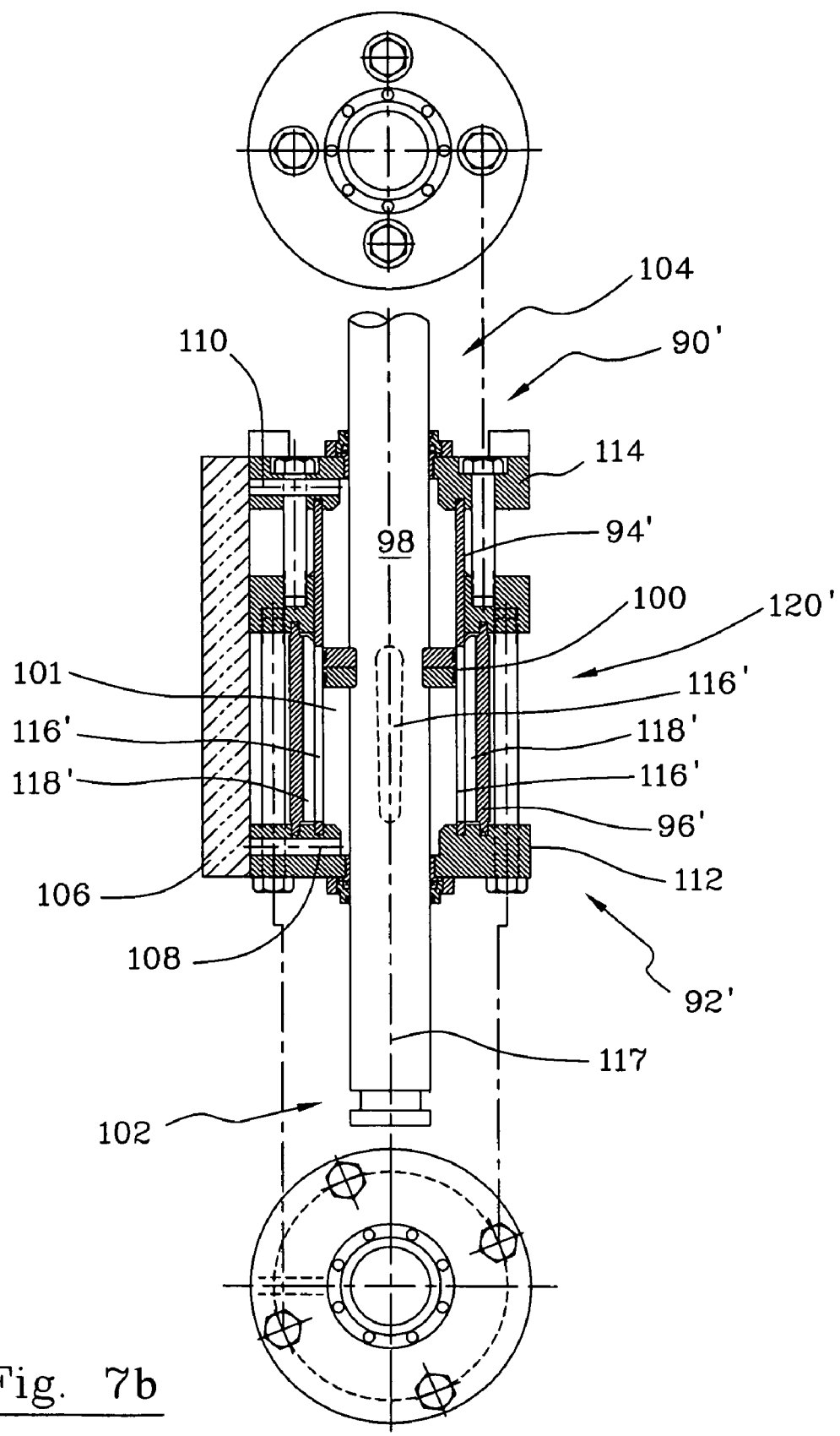
Figure 7C:
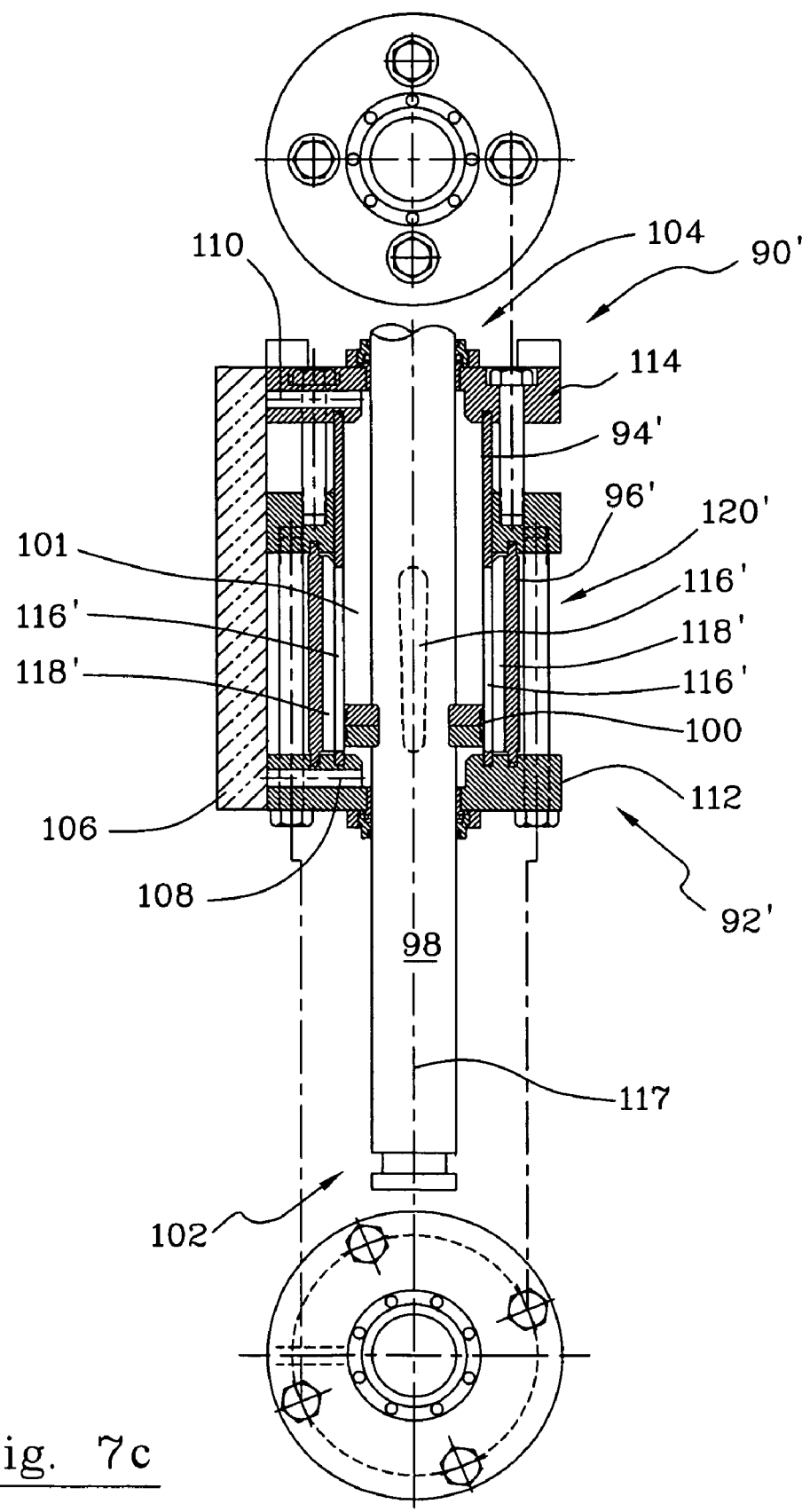

FIGS. 7a-c show graphic illustrations of a third embodiment of the inventive valve assembly, shown generally at 90', with those elements of FIGS. 4-6 identified with the same reference numbers, and those elements requiring modification identified with a prime ("'"). As shown in FIGS. 7a-c, the slots 116' and channels 118' formed in the inner cylindrical housing 94' and outer cylindrical housing 96', respectively, are located to allow the free flow of fluid therethrough during the second half of the valve closing stroke (and, in turn, during the first half of the valve opening stroke). The outer cylindrical housing 96' is provided at the lower portion of the valve 92' so that the channels 118' formed therein may align with the slots 116' formed in the inner cylindrical housing 94'.

Prior to initiating a closing stroke, the valve 92' will be in the fully open position shown in FIG. 7a, with the piston 100 positioned at the top of the housing interior 101. Upon initiation of the closing stroke, the actuator (not shown) moves the stem 98 and piston 100 downward from the position shown in FIG. 7a to the position shown in FIG. 7b, which illustrates the valve 92' in a half closed (half stroke) position. As the piston 100 is moved downward during the first half of the closing stroke, the speed of the stem 98 will be conventionally controlled by the force compensating assembly 106, and the slots 116' and channels 118' will have no effect on the stem 98 velocity. The slots 116' and channels 118' are disposed on the bottom side of the piston 100 during the first half of the valve closing stroke. Rather, the hydraulic fluid is forced into the force compensating assembly 106 via port 108, flows through the force compensating assembly 106 and back to the housing interior 101 at the top side of the piston 100 via port 110. The force compensating assembly 106 conventionally controls the velocity of the stem 98 to have a desired velocity during the first half of the valve closing stroke.

During the second half of the valve closing stroke, as the stem 98 and piston 100 move from the position shown in FIG. 7b to the position shown in FIG. 7c, very little hydraulic fluid will enter the force compensating assembly 106 via port 108. Most of the hydraulic fluid will flow from the bottom side of the piston 100 through the slots 116' and into the channels 118', around the piston 100, and back into the housing interior 101 at the top side of the piston 100. Flow of fluid in this manner will continue until the piston 100 reaches the full stroke position shown in FIG. 7c. The fluid flow is regulated by the sizes and geometric aspects of the slots 116' and channels 118', as well as the alignment of the slots 116' and channels 118', as was described with respect to FIGS. 4-6. In this manner, during the second half of the valve closing stroke, the valve stem 98, and hence the valve gate (not shown), will have a high velocity as the hydraulic fluid will flow freely through the slots 116' and channels 118'.

Conversely, during the first half of the valve opening stroke, as the piston 100 moves from the position shown in FIG. 7c to the position shown in FIG. 7b, the hydraulic fluid will flow in a manner reverse to that of the second half of the valve closing stroke, as the slots 116' and channels 118' will allow fluid to flow from the top side of the piston 100 to the bottom side of the piston 100. The valve actuation velocity control device 120' may thus be utilized in controlling the speed of the stem 98 during the first half of the valve opening stroke. During the last half of the valve opening stroke, the speed of the stem 98 will be conventionally controlled by the force compensating assembly 106, and the slots 116' and channels 118' will have no effect on the stem 98 velocity. The slots 116' and channels 118' are disposed on the bottom side of the piston 100 during the second half of the valve opening stroke.

In this manner, the inventive valve assembly allows a desired media flow characteristic to be obtained during either the valve opening stroke or the valve closing stroke without departing from the spirit and scope of the present invention. For example, embodiments of the present invention have been described illustrating the placement of the valve actuation control device at either the first or second halves of the valve's opening and/or closing stroke. However, the valve actuation velocity control device of the present invention may be located at any portion of the valve's opening and/or closing stroke (for example, a middle portion) without departing from the spirit and scope of the present invention.

Figure 8A:
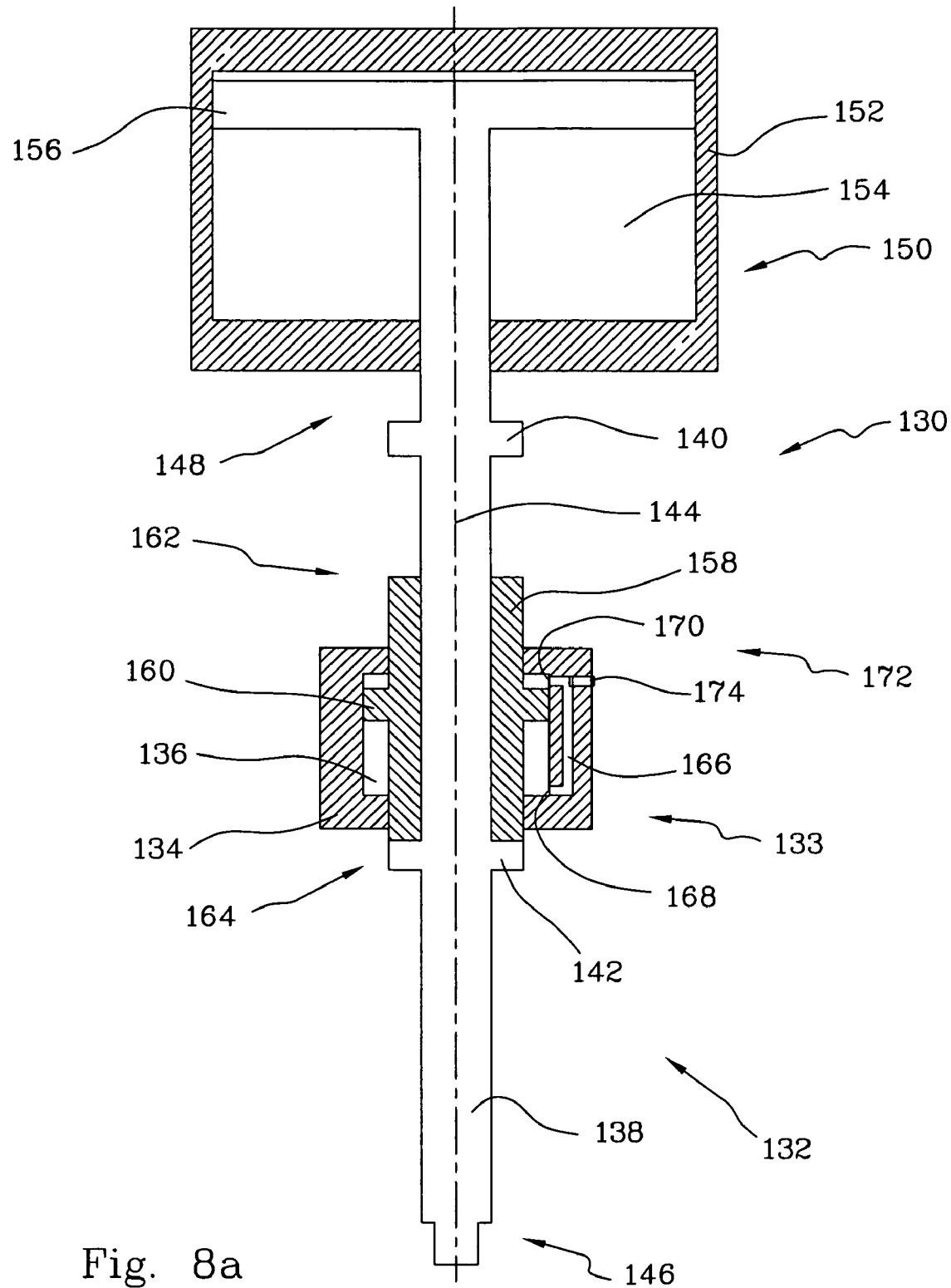
FIGS. 8a-d are partial cross-sectional views of a valve assembly according to a fourth embodiment of the present invention, with the valve in open (FIG. 8a), half closed (half stroke) (FIG. 8b), fully closed (full stroke) (FIG. 8c) and half open (FIG. 8d) positions.
Figure 8B:
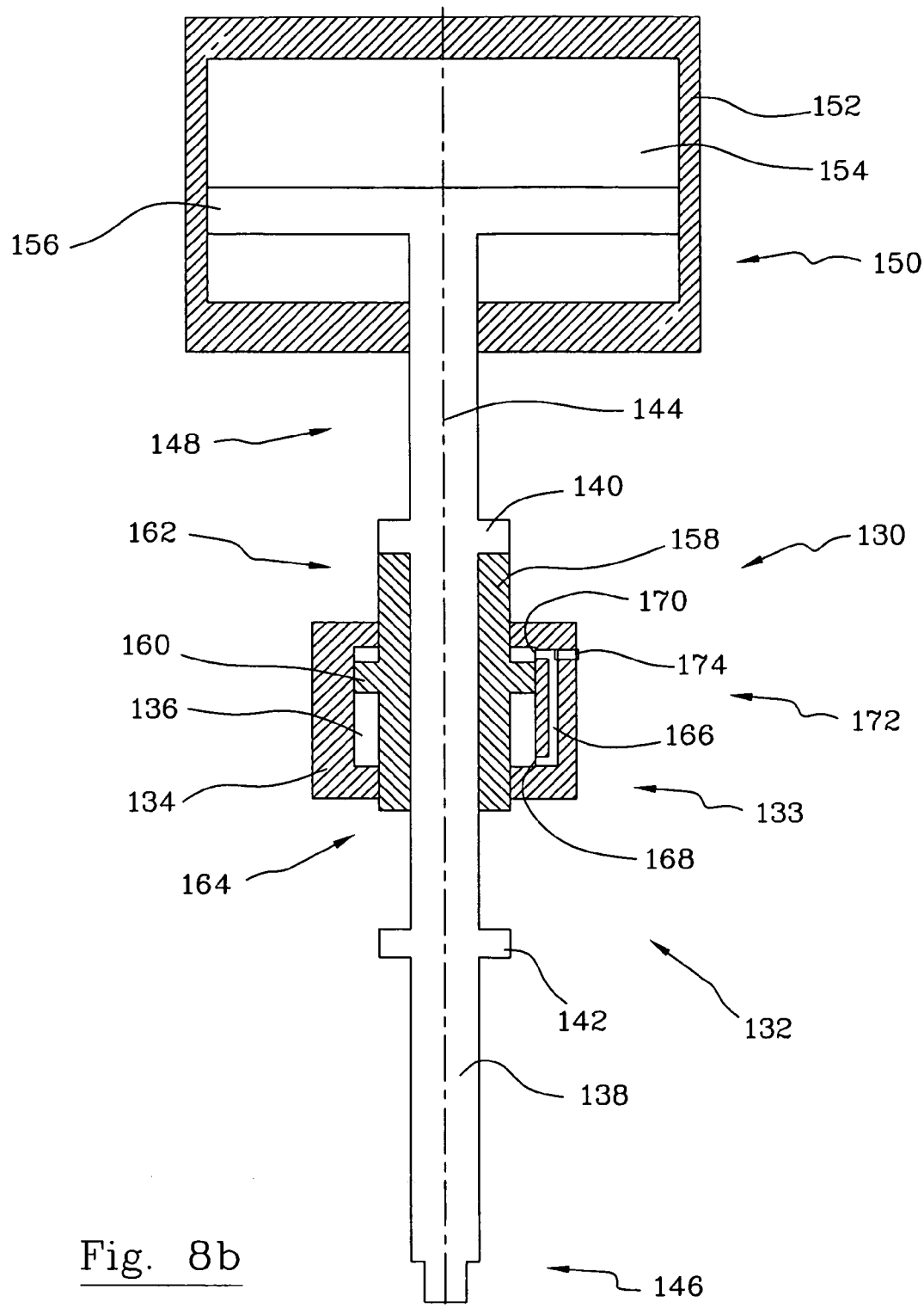
Figure 8C:
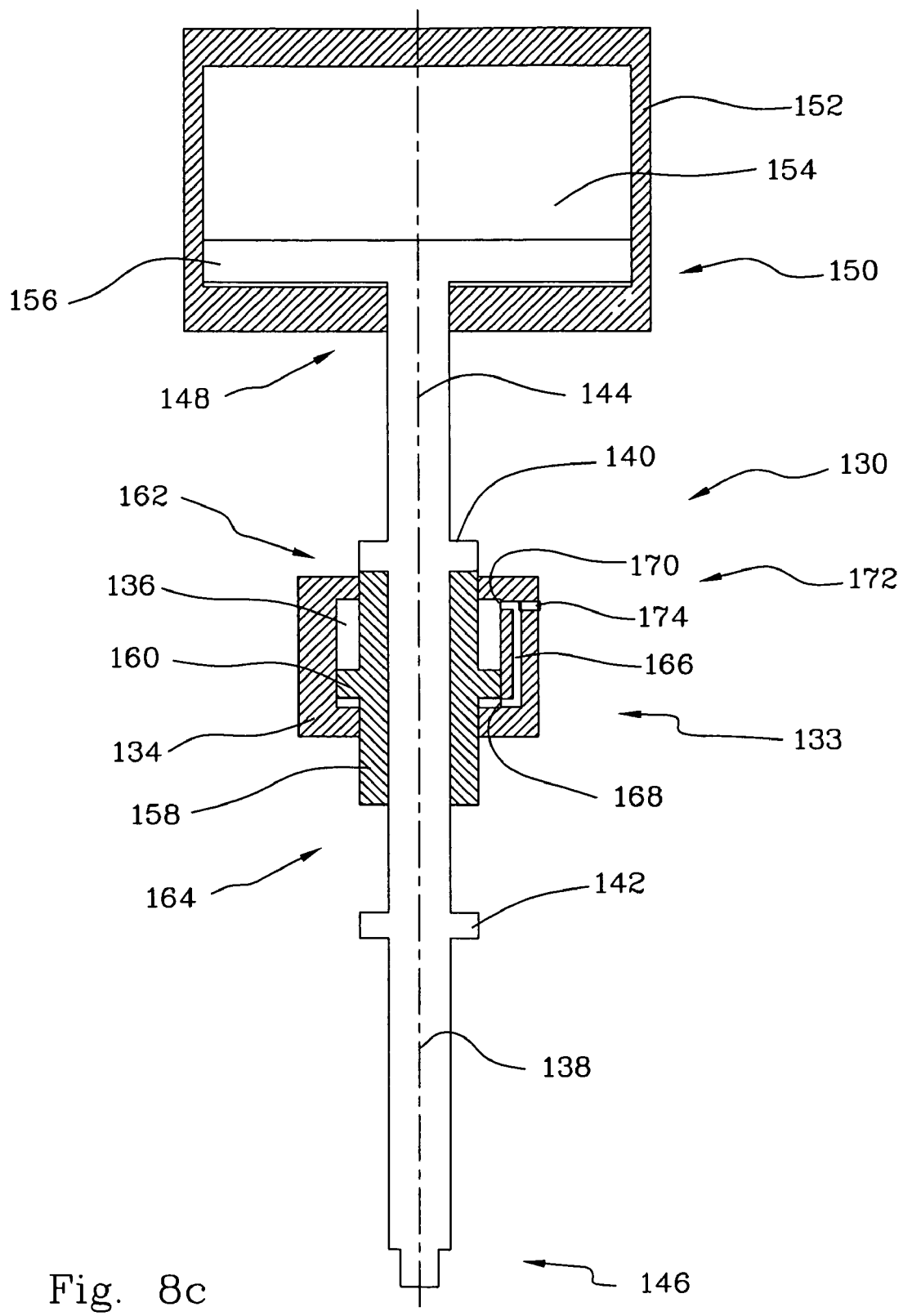
Figure 8D:
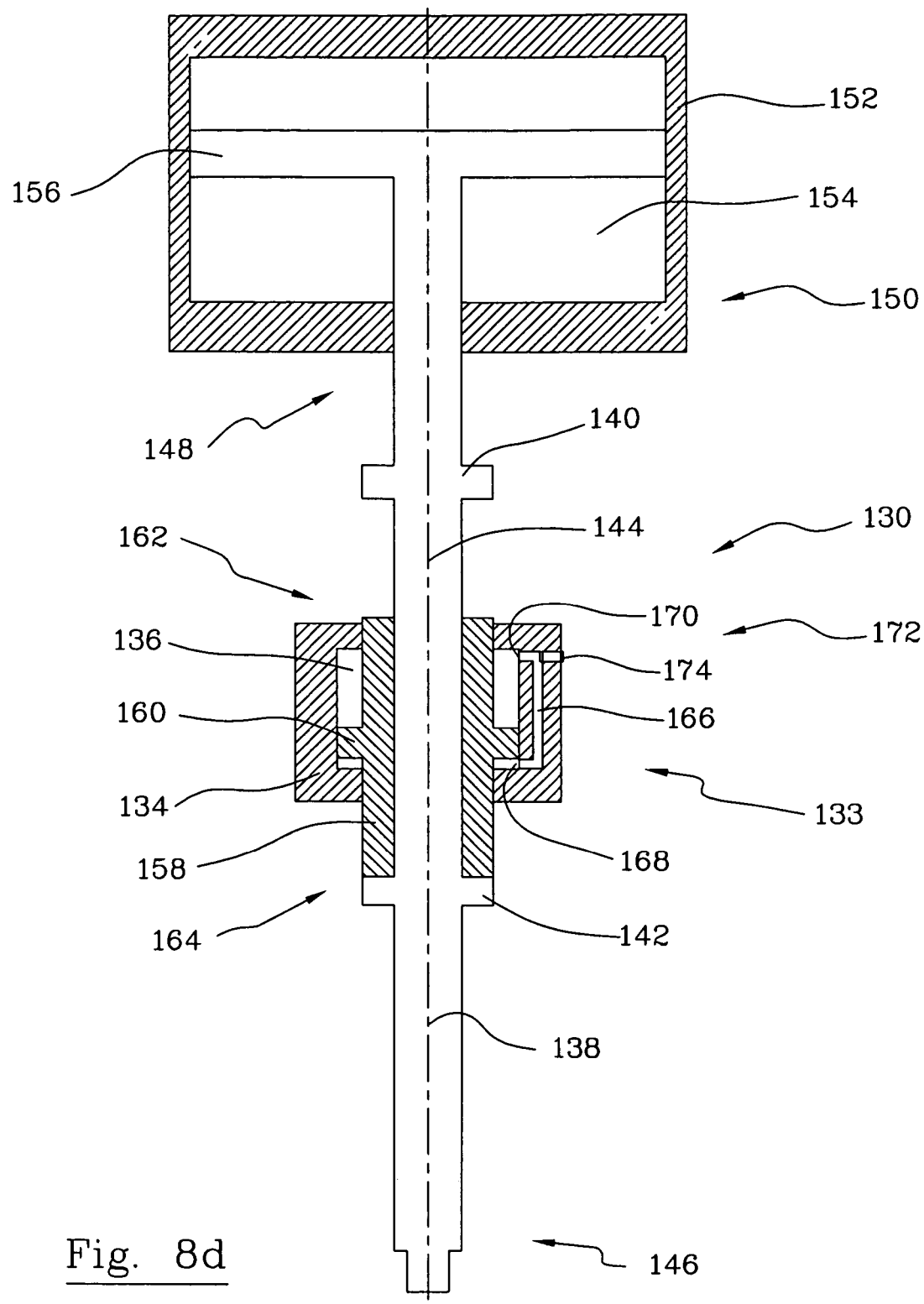

FIGS. 8a-d show graphic illustrations of a fourth embodiment of the inventive valve assembly, shown generally at 130. FIG. 8a illustrates the valve assembly 130 in a fully open position; FIG. 8b illustrates the valve assembly 130 in a half closed (half stroke) position; FIG. 8c illustrates the valve assembly 130 in a fully closed (full stroke) position; and FIG. 8d illustrates the valve assembly 130 in a half open position. For clarity purposes, the valve body and valve gate have been omitted from FIGS. 8a-d.

The assembly 130 includes a valve 132, having a velocity regulating portion 133 including a housing 134 defining an interior 136. The valve 132 further includes a valve stem 138, having upper 140 and lower 142 pistons attached to the valve stem 138 for movement therewith externally of the housing 134. The upper 140 and lower 142 pistons are attached to the valve stem 138 on opposite sides of the housing 134. The valve stem 138 moves along its axis 144 to open and close the valve 132. The lower portion 146 of the valve stem 138 is connected to a valve gate (not shown) which is received in a valve body (also not shown) in a well-known manner. The upper portion 148 of the valve stem 138 is connected to a valve actuator 150 which effectuates opening and closing of the valve 132 as is known in the relevant art.

The valve actuator 150 includes a housing 152 defining an interior 154. The valve actuator 150 further includes a piston 156 disposed in the interior 154 of the housing 152. Typically, the interior 154 will be empty, such that the piston 156 is free to move in the housing interior with little resistance. The valve actuator 150 effectuates opening and closing of the valve 132 as is known in the relevant art.

The velocity regulating portion 133 includes a sleeve portion 158 provided concentrically about the valve stem 138 at the portion between the upper 140 and lower 142 pistons. The sleeve portion 158 is moveable along the axis 144, and includes a piston 160 attached to the sleeve portion 158 for movement therewith. Both the sleeve portion 158 and the piston 160 are disposed within the housing interior 136, with the sleeve portion 158 including upper 162 and lower 164 ends which extend from the housing 134 on opposite sides thereof. The sleeve portion 158 is provided about the valve stem 138 such that the valve stem 138 is moveable with respect to the sleeve portion 158.

The housing interior 136 is filled with hydraulic, or other, fluid. The hydraulic fluid surrounds the sliding stem portion 158 and piston 160. A port 166 provided in the housing 134 fluidly connects the housing interior 136 at opposite sides of the piston 160. For example, the port 166 includes a lower opening 168 which opens into the interior 136 on a bottom side of the piston, and a top opening 170 which opens into the interior 136 on a top side of the piston 160. The upper piston 140, lower piston 142 and velocity regulating portion 133 together make up the valve actuation velocity control device 172.

Prior to initiating a closing stroke, the valve 132 will be in the fully opened position shown in FIG. 8a with: the actuator piston 156 positioned at the top of the housing interior 154; the piston 160 positioned at the top of the housing interior 136; and the lower piston 142 positioned generally adjacent the lower end 164 of the sleeve portion 158. Upon initiation of the closing stroke, the actuator 150 moves the stem 138 and pistons 140, 142 downward from the position shown in FIG. 8a to the position shown in FIG. 8b, which illustrates the valve 132 in a half closed (half stroke) position. As the valve stem 138 is moved downward during the first half of the closing stroke, little resistance is provided to the piston 156 within the actuator housing interior 154. Additionally, during this first half of the closing stroke, the sleeve portion 158 and piston 160 generally remain stationery as the valve stem 138 moves downward relative thereto. Since the valve stem 138 encounters little resistance during this first half of the valve closing stroke, the valve stem 138, and hence the valve gate (not shown) will have a high initial velocity. For example, the velocity may be characterized by line 24a in FIG. 1.

At the half closed (half stroke) position shown in FIG. 8b, the upper piston 140 contacts the upper end 162 of the sliding valve stem portion 158. Conventional shock absorbing structure (not shown) may be provided to lessen the impact of the upper piston 140 contacting the upper end 162.

During the second half of the valve closing stroke, as the valve stem 138 moves from the position shown in FIG. 8b to the position shown in FIG. 8c, the velocity regulating portion, via the sleeve portion 158 and piston 160, slows the movement (i.e., velocity) of the valve stem 138. As the sleeve portion 158 and piston 160 move from the position shown in FIG. 8b to the position shown in FIG. 8c, via the upper piston 140, hydraulic fluid is forced into the port 166 at the lower opening 168 and flows back to the housing interior 136 at the top side of the piston 160 via top opening 170. In this manner, the velocity of the valve stem 138 is controlled by the flow of hydraulic fluid from one side of the piston 160 to the other. Such control may be effectuated by a radial screw (not shown) receivable in slot 174 to control the amount of fluid able to flow through the port 166, as well as the geometry of the port 166 itself. In this manner, the velocity regulating portion 133 can control the velocity of the stem 138 to have a constant, slower velocity (for example, as shown at line 24b in FIG. 1) during the second or last half of the valve closing stroke.

Conversely, during the first half of the valve opening stroke, as the valve stem 138 moves from the position shown in FIG. 8c to the position shown in FIG. 8d, the speed of the valve stem 138 will have an initial high velocity, as little resistance is provided to the piston 156 within the actuator interior 154 as well as to the valve stem 138. Once the lower piston 142 contacts the lower end 164 of the sleeve portion 158 (see FIG. 8d) (conventional shock absorbing structure (not shown) may be provided to lessen the impact of the lower piston 142 contacting the lower end 164), fluid will flow in a reverse manner to that previously described and will be forced from the top side of the piston 160 to the bottom side via port 166. The velocity of the valve stem 138 is controlled by the flow of hydraulic fluid from one side of the piston 160 to the other, and such control may be effectuated by a radial screw (not shown) receivable in slot 174 to control the amount of fluid able to flow through the port 166, as well as the geometry of the port 166 itself. In this manner, the velocity regulating portion 133 can control the velocity of the valve stem 138 to have a constant, slower velocity during the second or last half of the valve opening stroke as the valve stem 138 moves from the position shown in FIG. 8d to the position shown in FIG. 8a.

Thus, using the embodiment shown in FIGS. 8a-d, the valve stem 138 will have an initial, high velocity during both the first half of the valve opening and closing strokes, and will have a slower velocity during the second half of the valve opening and closing strokes.

It should be noted that only a few methods and apparatus to control the valve stem velocity during opening and/or closing are described herein, such as, for example, providing for the free flow of hydraulic fluid from one side of the piston to the other during the valve closing stroke to control the valve stem velocity. One skilled in the art will readily appreciate that various other methods and apparatus could be implemented in accordance with the teaching of the present invention without departing from the spirit and scope of the present invention. While the present invention has been described in connection with the drawings, it should be understood that various modifications may be made without departing from the spirit and scope of the present invention.

We claim:

1. A valve assembly comprising:
a valve housing having an axis and defining an interior;
a fluid provided in the valve housing and substantially filling the housing interior;
a valve stem disposed in the housing interior;
a piston attached to the valve stem, wherein the piston and valve stem are movable along the housing axis within the housing interior between first and second positions, wherein movement of the piston from the first position to the second position defines either a closing stroke or an opening stroke of the valve assembly; and
a valve actuation control device disposed in the housing interior, the valve actuation control device allowing the fluid to freely flow from one side of the piston to the other side during one portion of the piston's movement between the first and second positions, such that the valve stem has a first velocity during the one portion of the piston's movement, wherein the first velocity is greater than a velocity of the valve stem during the other portions of the piston's movement between the first and second positions.

2. The valve assembly of claim 1, further comprising a force compensating assembly in fluid communication with the housing interior, the force compensating assembly regulating the flow of fluid from one side of the piston to the other side during the other portions of the piston's movement between the first and second positions, such that the valve stem has a second velocity slower than the first velocity during the other portions of the piston's movement.

3. The valve assembly of claim 1, wherein the first position defines a valve open/closed position and the second position defines a valve closed/open position, and wherein the valve actuation control device is configured to allow the fluid to freely flow from one side of the piston to the other side during an initial portion of the piston's movement from the first position to the second position.

4. The valve assembly of claim 3, wherein the valve actuation control device is configured to allow the fluid to freely flow from one side of the piston to the other side during a first half of the closing/opening stroke, such that a velocity of the valve stem during the first half of the closing/opening stroke is greater than the velocity of the valve stem during a second half of the closing/opening stroke.

5. The valve assembly of claim 1, wherein the first position defines a valve open/closed position and the second position defines a valve closed/open position, and wherein the valve actuation control device is configured to allow the fluid to freely flow from one side of the piston to the other side during an ending portion of the piston's movement from the first position to the second position.

6. The valve assembly of claim 5, wherein the valve actuation control device is configured to allow the fluid to freely flow from one side of the piston to the other side during a second half of the closing/opening stroke, such that a velocity of the valve stem during the second half of the closing/opening stroke is greater than the velocity of the valve stem during a first half of the closing/opening stroke.

7. The valve assembly of claim 1, wherein the fluid comprises hydraulic fluid.

8. The valve assembly of claim 1, wherein the valve actuation control device comprises at least one tube disposed in the housing interior generally parallel to the housing axis, the at least one tube including at least one aperture formed therein for allowing the fluid to freely flow from one side of the piston to the other side during the one portion of the piston's movement between the first and second positions.

9. The valve assembly of claim 8, wherein the at least one tube extends through at least one cooperating aperture formed in the piston such that the piston is movable along the at least one tube length.

10. The valve assembly of claim 1, wherein the valve housing comprises inner and outer coaxial housings, wherein the piston and valve stem are movable along the housing axis within the inner housing interior between the first and second positions, wherein the inner housing includes at least one slot formed therein for allowing the fluid to freely flow from one side of the piston to the other side during the one portion of the piston's movement between the first and second positions.

11. The valve assembly of claim 10, wherein the outer housing includes at least one channel formed therein, the at least one channel in the outer housing alignable with the at least one slot in the inner housing for allowing the fluid to freely flow one side of the piston to the other side during the one portion of the piston's movement between the first and second positions.

12. The valve assembly of claim 11, wherein at least one of the inner and outer housings are rotatable for selectively aligning the at least one slot and the at least one channel.

13. In a valve assembly including a valve housing having an axis and defining an interior, a fluid provided in the valve housing and substantially filling the housing interior, a valve stem disposed in the housing interior and a piston attached to the valve stem, wherein the piston and valve stem are movable along the housing axis within the housing interior between first and second positions, wherein movement of the piston from the first position to the second position defines either a closing stroke or an opening stroke of the valve assembly, an apparatus for controlling a velocity of the valve stem, said apparatus comprising:
a valve actuation control device disposed in the housing interior, the valve actuation control device allowing the fluid to freely flow from one side of the piston to the other side during one portion of the piston's movement between the first and second positions, such that the valve stem has a first velocity during the one portion of the piston's movement, wherein the first velocity is greater than a velocity of the valve stem during the other portions of the piston's movement between the first and second positions.

14. The apparatus of claim 13, further comprising a force compensating assembly in fluid communication with the housing interior, the force compensating assembly regulating the flow of fluid from one side of the piston to the other side during the other portions of the piston's movement between the first and second positions, such that the valve stem has a second velocity slower than the first velocity during the other portions of the piston's movement.

15. The apparatus of claim 13, wherein the valve actuation control device comprises at least one tube disposed in the housing interior generally parallel to the housing axis, the at least one tube including at least one aperture formed therein for allowing the fluid to freely flow from one side of the piston to the other side during the one portion of the piston's movement between the first and second positions.

16. The apparatus of claim 15, wherein the at least one tube extends through at least one cooperating aperture formed in the piston such that the piston is movable along the at least one tube length.

17. The apparatus of claim 13, the valve actuation control device comprises an inner housing coaxial with the valve housing, wherein the piston and valve stem are movable along the housing axis within the inner housing interior between the first and second positions, wherein the inner housing includes at least one slot formed therein for allowing the fluid to freely flow from one side of the piston to the other side during the one portion of the piston's movement between the first and second positions.

18. The apparatus of claim 17, wherein the valve housing includes at least one channel formed therein, the at least one channel in the valve housing alignable with the at least one slot in the inner housing for allowing the fluid to freely flow one side of the piston to the other side during the one portion of the piston's movement between the first and second positions.

19. The apparatus of claim 18, wherein at least one of the inner and valve housings are rotatable for selectively aligning the at least one slot and the at least one channel.

20. In a valve assembly having a valve housing defining an interior, a fluid provided in the valve housing and substantially filling the housing interior, a valve stem disposed in the housing interior, and a piston attached to the valve stem, wherein the piston and valve stem are movable within the housing interior between first and second positions, wherein movement of the piston from the first position to the second position defines either a closing stroke or an opening stroke of the valve assembly, a method of controlling a velocity of the valve stem, said method comprising the step of:
(a) providing for the free flow of fluid from one side of the piston to the other side during one portion of the piston's movement between the first and second positions, such that the valve stem has a first velocity during the one portion of the piston's movement; and
(b) providing for the regulated flow of fluid from one side of the piston to the other side during the other portions of the piston's movement between the first and second positions, such that the valve stem has a second velocity slower than the first velocity during the other portions of the piston's movement.

21. The method of claim 20, wherein step (a) comprises the step of:
providing a valve actuation control device disposed in the housing interior, the valve actuation control device allowing the fluid to freely flow from one side of the piston to the other side during the one portion of the piston's movement between the first and second positions.

22. A valve assembly comprising:
a valve stem having an axis and including first and second pistons attached thereto separated by a distance, wherein the valve stem and first and second pistons are movable along the axis between first and second positions, wherein movement of the valve stem and first and second pistons from the first position to the second position defines either a closing stroke or an opening stroke of the valve assembly; and
a velocity regulating portion operably connected to the valve stem at a portion between the first and second pistons, the velocity regulating portion controlling the velocity of the valve stem during a final portion of the valve stem's movement between the first and second positions, wherein the velocity of the valve stem during the final portion of the valve stem's movement is less than the velocity of the valve stem during an initial portion of the valve stem's movement.

23. The valve assembly of claim 22, wherein the velocity regulating portion comprises:
a housing provided about the valve stem at the portion between the first and second pistons, the housing defining an interior;
a fluid provided in the housing and substantially filling the housing interior;
a sleeve portion provided about the valve stem such that the valve stem is moveable with respect to the sleeve portion and disposed in the housing interior, the sleeve portion having first and second ends extending from the housing at opposite sides thereof; and
a third piston attached to the sleeve portion, the third piston and sleeve portion movable along the axis within the housing interior between third and fourth positions, wherein movement of the third piston and sleeve portion from the third position to the fourth position defines the final portion of the valve stem's movement between the first and second positions, wherein the flow of fluid from one side of the third piston to the other is controlled by a port formed in the housing connecting the housing interior on opposite sides of the third piston, such that the velocity of the valve stem during the final portion of the valve stem's movement is less than the velocity of the valve stem during an initial portion of the valve stem's movement.

24. The valve assembly of claim 23, wherein movement of the valve stem and first and second pistons from the first position to the second position defines a closing stroke of the valve assembly, and wherein during movement of the valve stem and the first and second pistons from the first position to the second position the first piston contacts the first end of the sleeve portion to effectuate movement of the sleeve portion and third piston from the third position to the fourth position during the final portion of the valve stem's movement between the first and second positions.

25. The valve assembly of claim 24, wherein movement of the valve stem and first and second pistons from the second position to the first position defines an opening stroke of the valve assembly, and wherein during movement of the valve stem and the first and second pistons from the second position to the first position the second piston contacts the second end of the sleeve portion to effectuate movement of the sleeve portion and third piston from the fourth position to the third position during the final portion of the valve stem's movement between the second and first positions.

* * * * *